US012731966B2

(12) United States Patent
O'Rourke et al.

(10) Patent No.: US 12,731,966 B2
(45) Date of Patent: Sep. 8, 2026

(54) ELECTRICAL EQUIPMENT MANAGEMENT

(71) Applicant: Schneider Electric USA, Inc., Andover, MA (US)

(72) Inventors: Benjamin Patrick O'Rourke, Morrisville, NC (US); James Raymond Ramsey, Murfreeboro, TN (US); Pankaj Lal, Brentwood, TN (US); Richard Kent Crawford, Rockvale, TN (US); Xavier Lifran, Franklin, TN (US)

(73) Assignee: Schneider Electric USA, Inc., Boston, MA (US)

( * ) Notice: Subject to any disclaimer, the term of this patent is extended or adjusted under 35 U.S.C. 154(b) by 669 days.

(21) Appl. No.: 18/017,627

(22) PCT Filed: Jul. 23, 2021

(86) PCT No.: PCT/US2021/043082

§ 371 (c)(1),
(2) Date: Jan. 23, 2023

(87) PCT Pub. No.: WO2022/020786

PCT Pub. Date: Jan. 27, 2022

(65) Prior Publication Data

US 2023/0359161 A1 Nov. 9, 2023

Related U.S. Application Data

(60) Provisional application No. 63/055,927, filed on Jul. 24, 2020, provisional application No. 63/055,938, filed on Jul. 24, 2020.

(51) Int. Cl.
*H02B 3/00* (2006.01)
*G05B 19/18* (2006.01)
(Continued)

(52) U.S. Cl.
CPC ............. *H02B 3/00* (2013.01); *G05B 19/188* (2013.01); *H01R 25/142* (2013.01); *H02B 1/04* (2013.01);
(Continued)

(58) Field of Classification Search
CPC . H02B 3/00; H02B 1/04; H02B 1/056; H02B 1/20; G05B 19/188;
(Continued)

(56) References Cited

U.S. PATENT DOCUMENTS

| | | | |
|---|---|---|---|
| 6,224,385 B1 | 5/2001 | Nitta et al. | |
| 2003/0172002 A1* | 9/2003 | Spira ................. | G06Q 30/0601 705/26.1 |

(Continued)

FOREIGN PATENT DOCUMENTS

| | | |
|---|---|---|
| CA | 3095543 A1 | 10/2019 |
| CN | 101084515 A | 12/2007 |

(Continued)

OTHER PUBLICATIONS

Extended European Search Report dated Jul. 23, 2024 for corresponding European Patent Application No. 21846564.9-1201, 11 pages.

(Continued)

*Primary Examiner* — Thienvu V Tran
*Assistant Examiner* — Muaamar Qahtan Al-Taweel
(74) *Attorney, Agent, or Firm* — Patterson + Sheridan, LLP

(57) ABSTRACT

Techniques are described for electrical equipment management. Embodiments include receiving and validating a login request from a user. Receiving a selection of an order of an electrical equipment system to assemble and, in response, retrieving and providing a plurality of instructions. Performing an iterative assembly process to manage the assembly of
(Continued)

the electrical equipment system by the user, wherein the iterative assembly process comprises iterating through the plurality of instructions for assembling the electrical equipment. Recording digital artifacts of the electrical equipment system during performance of the plurality instructions as part of the iterative assembly process and upon determining that compliance has been achieved for the assembled electrical equipment system based on the recorded digital artifacts satisfying a predefined compliance standard, record a final assembly report for the electrical equipment system. Embodiments include storing the final assembly report together with a unique identifier corresponding to the assembled electrical equipment system.

32 Claims, 26 Drawing Sheets

(51) Int. Cl.
*H01H 71/02* (2006.01)
*H01H 71/08* (2006.01)
*H01R 25/14* (2006.01)
*H02B 1/04* (2006.01)
*H02B 1/056* (2006.01)
*H02B 1/20* (2006.01)

(52) U.S. Cl.
CPC ............... *H02B 1/056* (2013.01); *H02B 1/20* (2013.01); *G05B 2219/31396* (2013.01); *H01H 2071/0278* (2013.01); *H01H 71/08* (2013.01)

(58) Field of Classification Search
CPC ........ G05B 2219/31396; H01R 25/142; H01R 11/07; H01R 2101/00; H01H 71/08; H01H 2071/0278
See application file for complete search history.

(56) References Cited

U.S. PATENT DOCUMENTS

| | | | | |
|---|---|---|---|---|
| 2006/0142889 | A1 | 6/2006 | Duggan et al. | |
| 2006/0172422 | A1* | 8/2006 | Dzekunov | C12M 41/48 435/459 |
| 2008/0103622 | A1 | 5/2008 | Hanses et al. | |
| 2008/0154409 | A1 | 6/2008 | Srikumar et al. | |
| 2010/0012819 | A1 | 1/2010 | Graham | |
| 2011/0040666 | A1* | 2/2011 | Crabtree | G06Q 50/06 702/179 |
| 2012/0005326 | A1* | 1/2012 | Bradetich | H04L 63/10 709/223 |
| 2013/0049952 | A1* | 2/2013 | Schnare | G01B 7/003 324/693 |
| 2014/0139406 | A1 | 5/2014 | Backhaus | |
| 2014/0142881 | A1 | 5/2014 | Storm | |
| 2017/0005515 | A1* | 1/2017 | Sanders | H02J 3/14 |
| 2017/0111258 | A1 | 4/2017 | Bezold et al. | |
| 2018/0088548 | A1* | 3/2018 | Sangi | F01K 13/02 |
| 2019/0080334 | A1 | 3/2019 | Copeland et al. | |
| 2019/0101463 | A1 | 4/2019 | Fly et al. | |
| 2019/0180433 | A1 | 6/2019 | Sasson et al. | |
| 2020/0026257 | A1 | 1/2020 | Dalal et al. | |
| 2020/0059081 | A1 | 2/2020 | Freeman et al. | |
| 2020/0098064 | A1 | 3/2020 | Cella | |
| 2020/0133224 | A1* | 4/2020 | Popp | G05B 19/188 |
| 2020/0136356 | A1 | 4/2020 | Schall et al. | |
| 2020/0250826 | A1* | 8/2020 | Cohen Maimon | G16H 30/20 |
| 2021/0135434 | A1 | 5/2021 | Hain et al. | |
| 2022/0108262 | A1 | 4/2022 | Cella et al. | |

FOREIGN PATENT DOCUMENTS

| | | | |
|---|---|---|---|
| CN | 105261977 | A | 1/2016 |
| CN | 107403050 | A | 11/2017 |
| CN | 108141385 | A | 6/2018 |
| CN | 109190575 | A | 1/2019 |
| DE | 102018109606 | B3 | 7/2019 |
| EP | 3244286 | A1 | 11/2017 |
| EP | 2732922 | B1 | 12/2019 |
| JP | 2004-302596 | A | 10/2004 |
| TW | M320238 | U | 10/2007 |
| WO | 2016202454 | A1 | 12/2016 |

OTHER PUBLICATIONS

International Search Report and Written Opinion mailed Oct. 22, 2021 in corresponding International Application No. PCT/US2021/043082, 21 pages.

International Preliminary Report on Patentability mailed on Dec. 16, 2022 in corresponding International Application No. PCT/US2021/043082, 42 pages.

Chinese Office Action dated Jun. 30, 2025 for corresponding Chinese Patent Application No. 202180063826.0, 10 pages.

Eslami, Babak et al. "Smart Fasteners and their Application in Flanged Joints", Aug. 1, 2012 [retrieved on Jun. 13, 2025], ASME 2011 International Mechanical Engineering Congress and Exposition, vol. 3, pp. 707-714. Retrieved from ASME: <URL: https://asmedigitalcollection.asme.org/IMECE/proceedings/IMECE2011/54891/707/354285>. <DOI: https://doi.org/10.1115/IMECE2011-64214>. (Year: 2012).

Extended European Search Report dated Jul. 19, 2024 for corresponding European Patent Application No. 21846736.3-1201, 10 pages.

International Search Report and Written Opinion mailed Nov. 4, 2021 in corresponding International Application No. PCT/US2021/043083, 11 pages.

Office Action received for Chinese Patent Application No. 202180063819.0, mailed on Sep. 22, 2025, 4 pages (Original Document only).

Tenaga, Suruhanjaya. "Approval of Electrical Equipment", Dec. 2010 [retrieved on Jun. 14, 2025], Malaysia Energy Commission. Retrieved from Association of Southeast Asian Nations: <URL: https://asean.org/>. (Year: 2010).

* cited by examiner

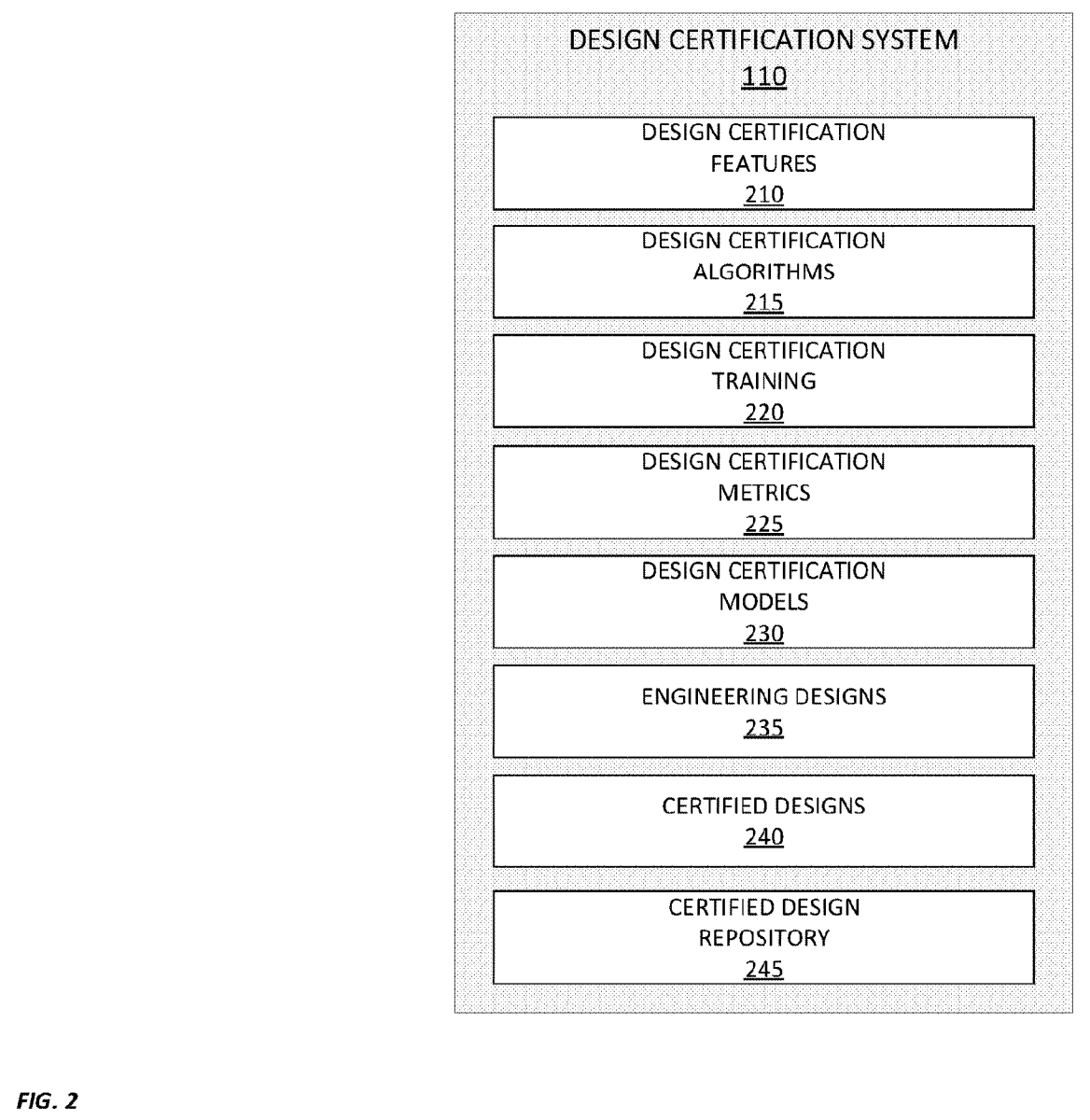

DESIGN CERTIFICATION SYSTEM
110

DESIGN CERTIFICATION FEATURES
210

DESIGN CERTIFICATION ALGORITHMS
215

DESIGN CERTIFICATION TRAINING
220

DESIGN CERTIFICATION METRICS
225

DESIGN CERTIFICATION MODELS
230

ENGINEERING DESIGNS
235

CERTIFIED DESIGNS
240

CERTIFIED DESIGN REPOSITORY
245

FIG. 2

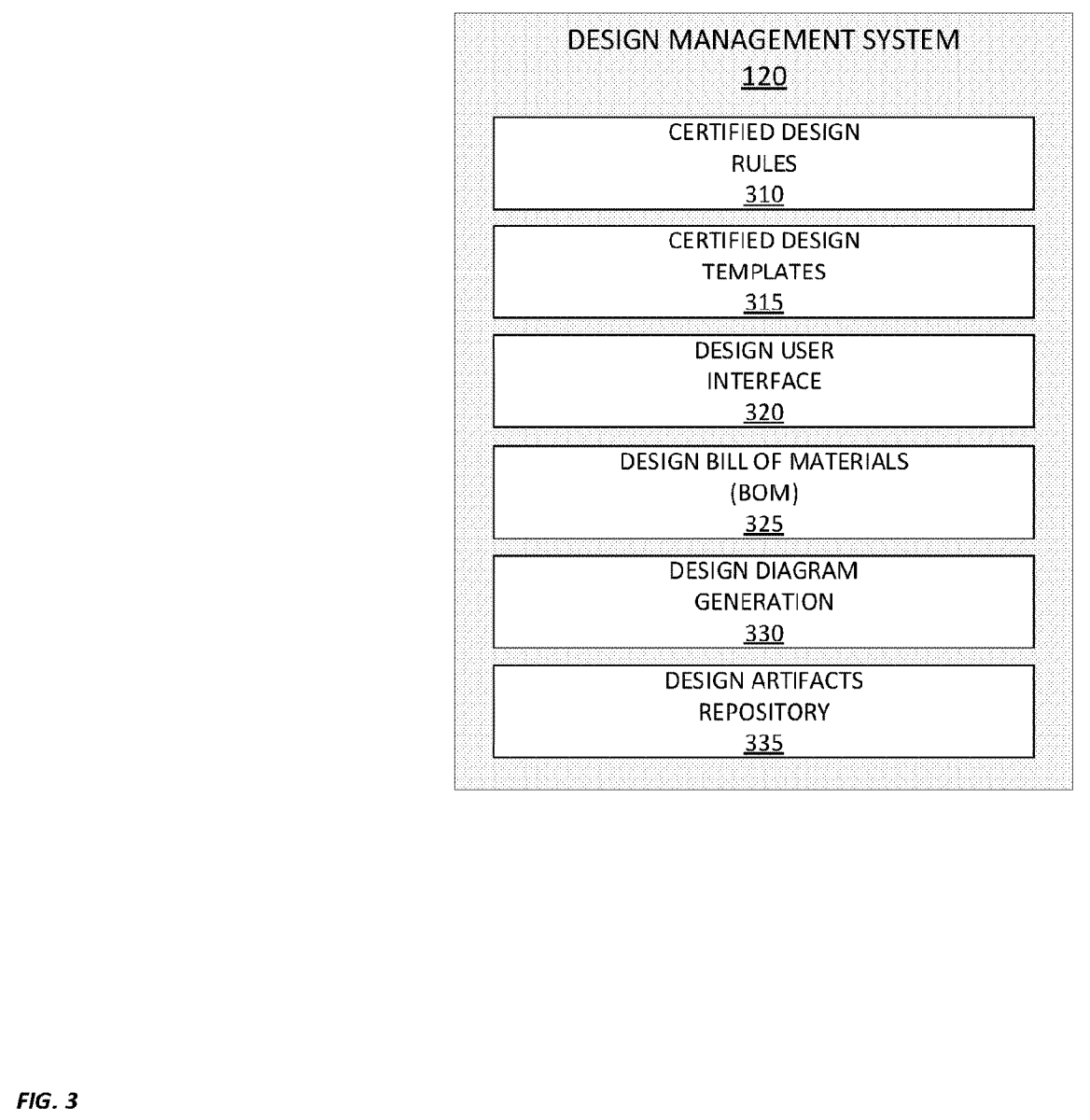

DESIGN MANAGEMENT SYSTEM
120

CERTIFIED DESIGN
RULES
310

CERTIFIED DESIGN
TEMPLATES
315

DESIGN USER
INTERFACE
320

DESIGN BILL OF MATERIALS
(BOM)
325

DESIGN DIAGRAM
GENERATION
330

DESIGN ARTIFACTS
REPOSITORY
335

*FIG. 3*

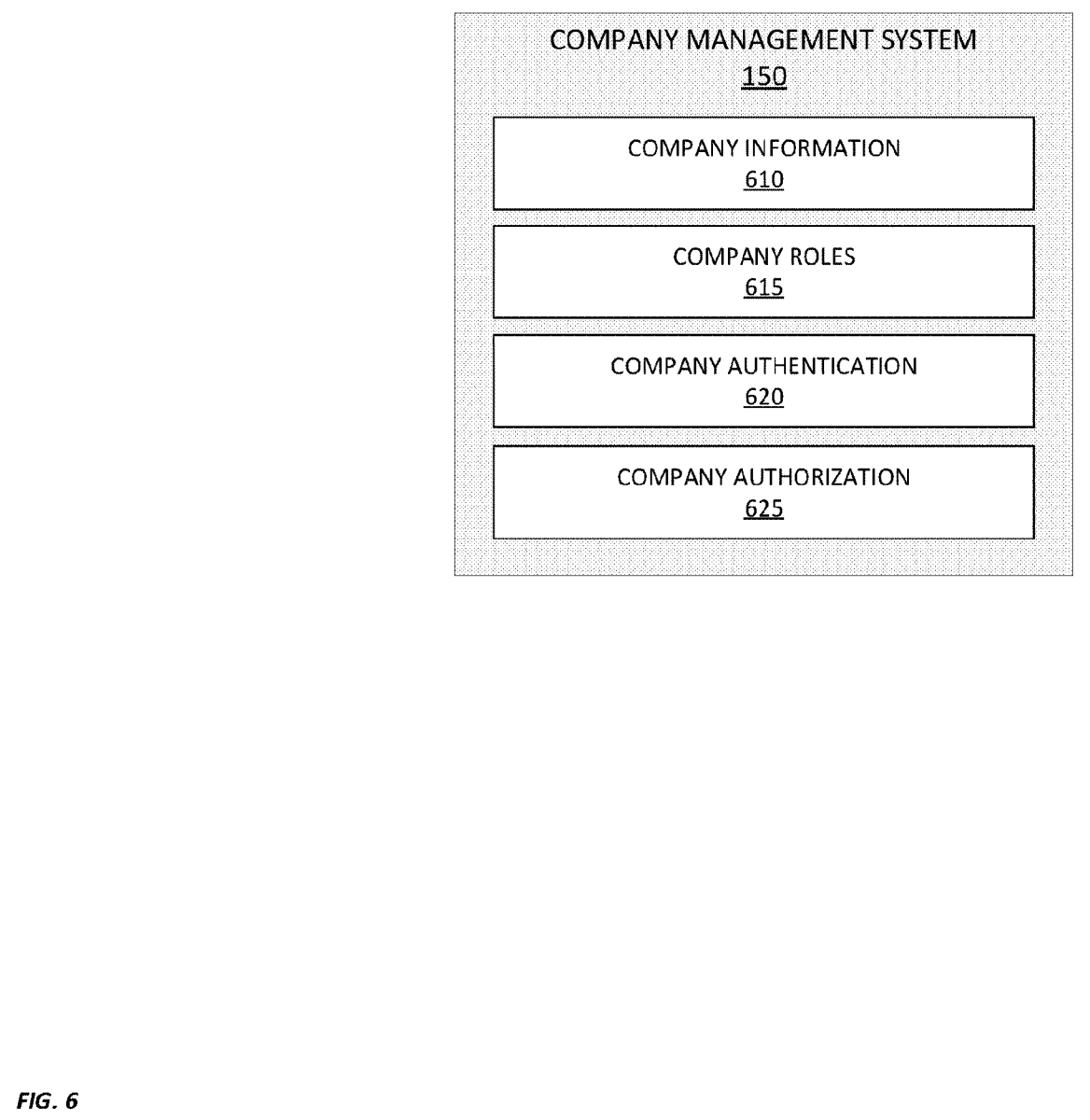

COMPANY MANAGEMENT SYSTEM
150

COMPANY INFORMATION
610

COMPANY ROLES
615

COMPANY AUTHENTICATION
620

COMPANY AUTHORIZATION
625

FIG. 6

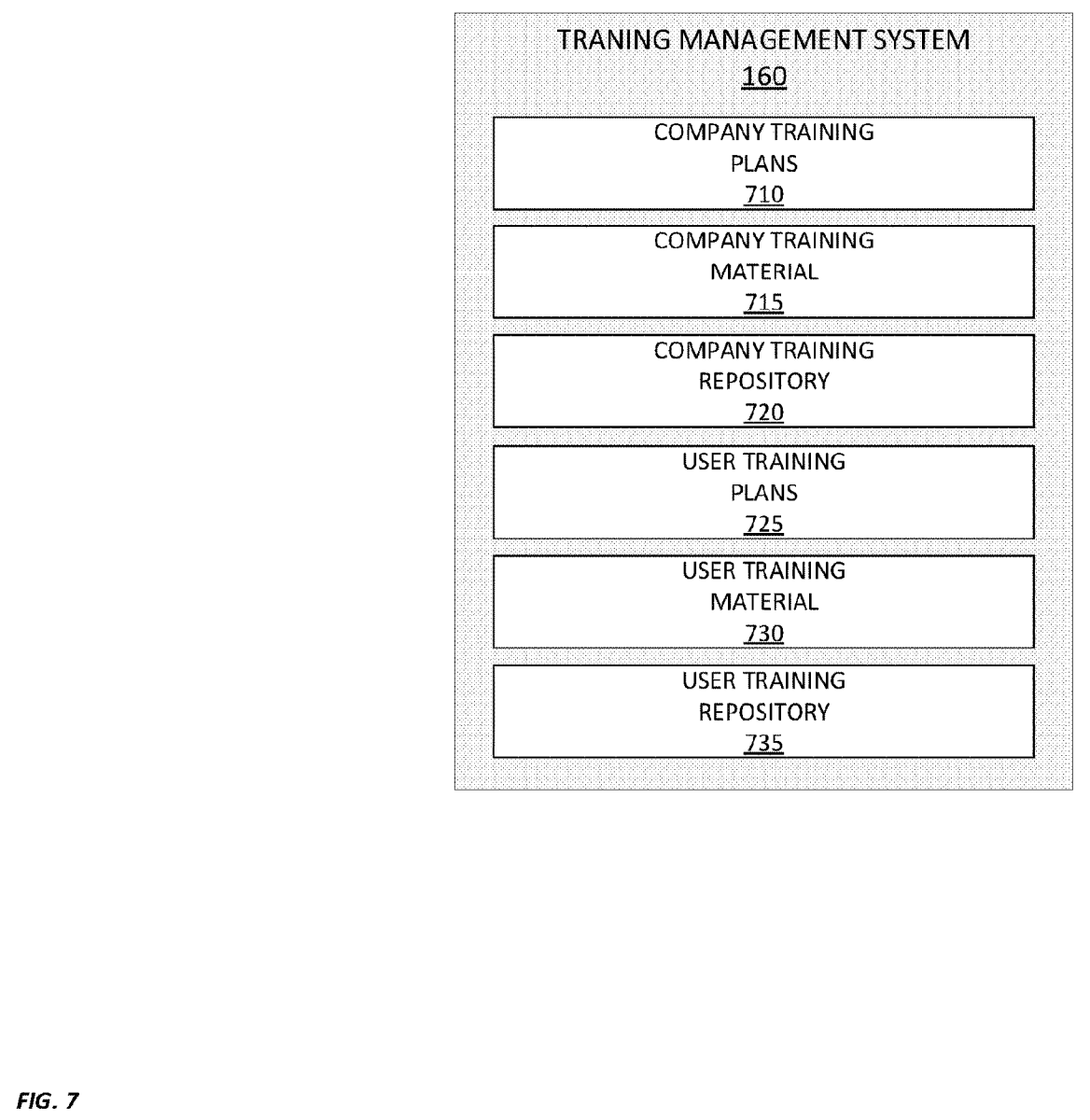

TRANING MANAGEMENT SYSTEM
160

COMPANY TRAINING PLANS
710

COMPANY TRAINING MATERIAL
715

COMPANY TRAINING REPOSITORY
720

USER TRAINING PLANS
725

USER TRAINING MATERIAL
730

USER TRAINING REPOSITORY
735

FIG. 7

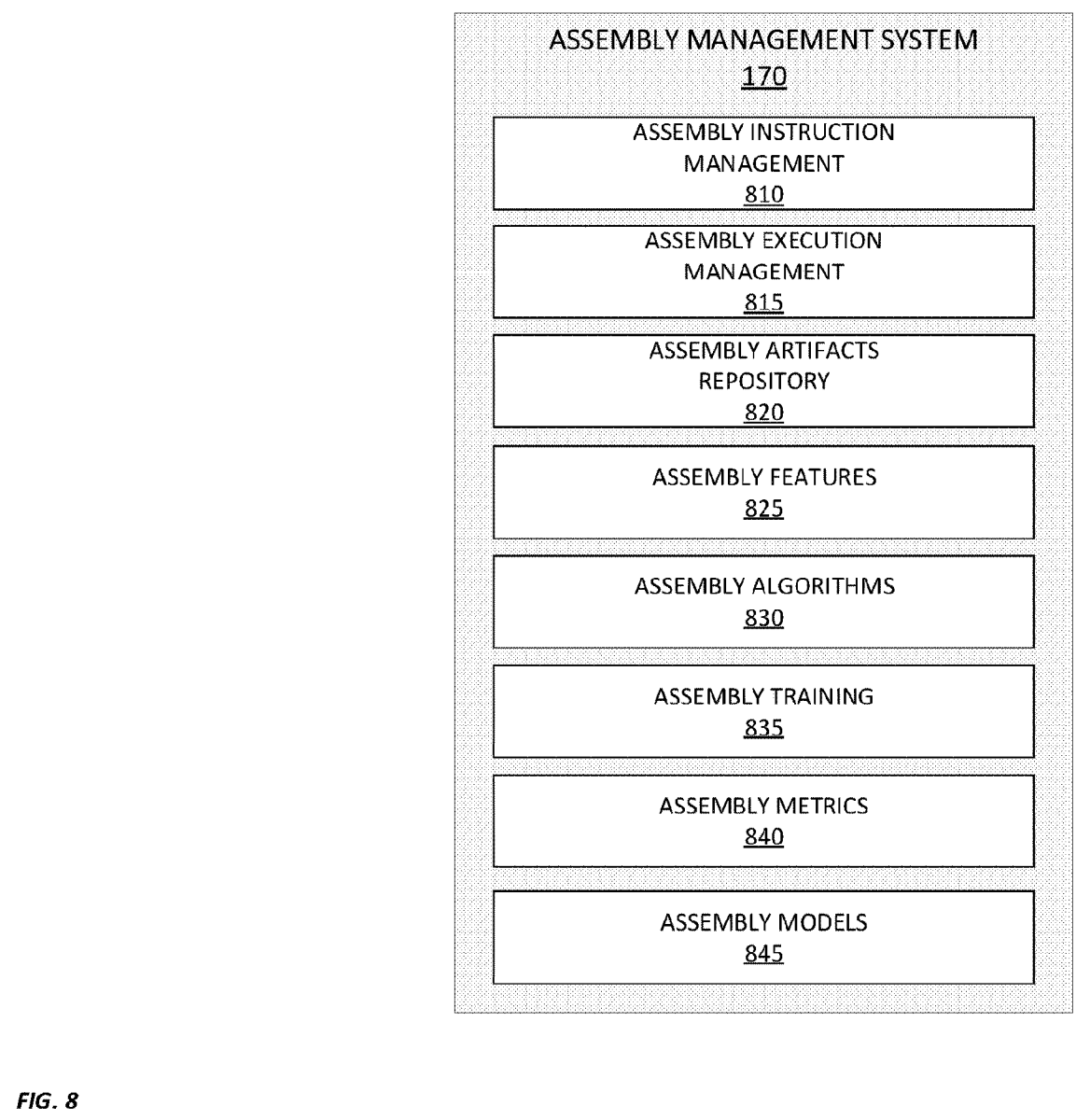

ASSEMBLY MANAGEMENT SYSTEM
170

ASSEMBLY INSTRUCTION MANAGEMENT
810

ASSEMBLY EXECUTION MANAGEMENT
815

ASSEMBLY ARTIFACTS REPOSITORY
820

ASSEMBLY FEATURES
825

ASSEMBLY ALGORITHMS
830

ASSEMBLY TRAINING
835

ASSEMBLY METRICS
840

ASSEMBLY MODELS
845

FIG. 8

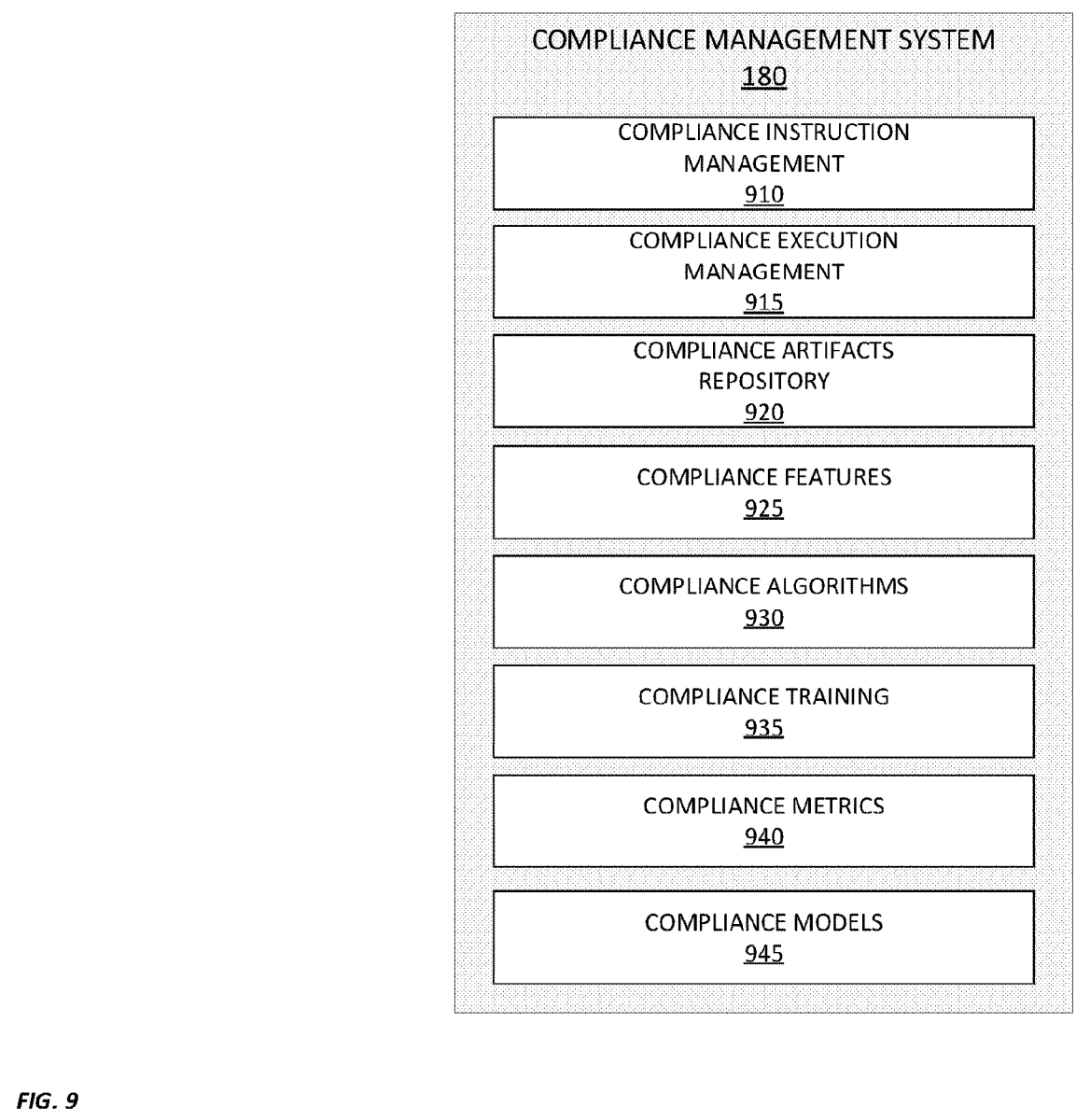

COMPLIANCE MANAGEMENT SYSTEM
180

COMPLIANCE INSTRUCTION MANAGEMENT
910

COMPLIANCE EXECUTION MANAGEMENT
915

COMPLIANCE ARTIFACTS REPOSITORY
920

COMPLIANCE FEATURES
925

COMPLIANCE ALGORITHMS
930

COMPLIANCE TRAINING
935

COMPLIANCE METRICS
940

COMPLIANCE MODELS
945

*FIG. 9*

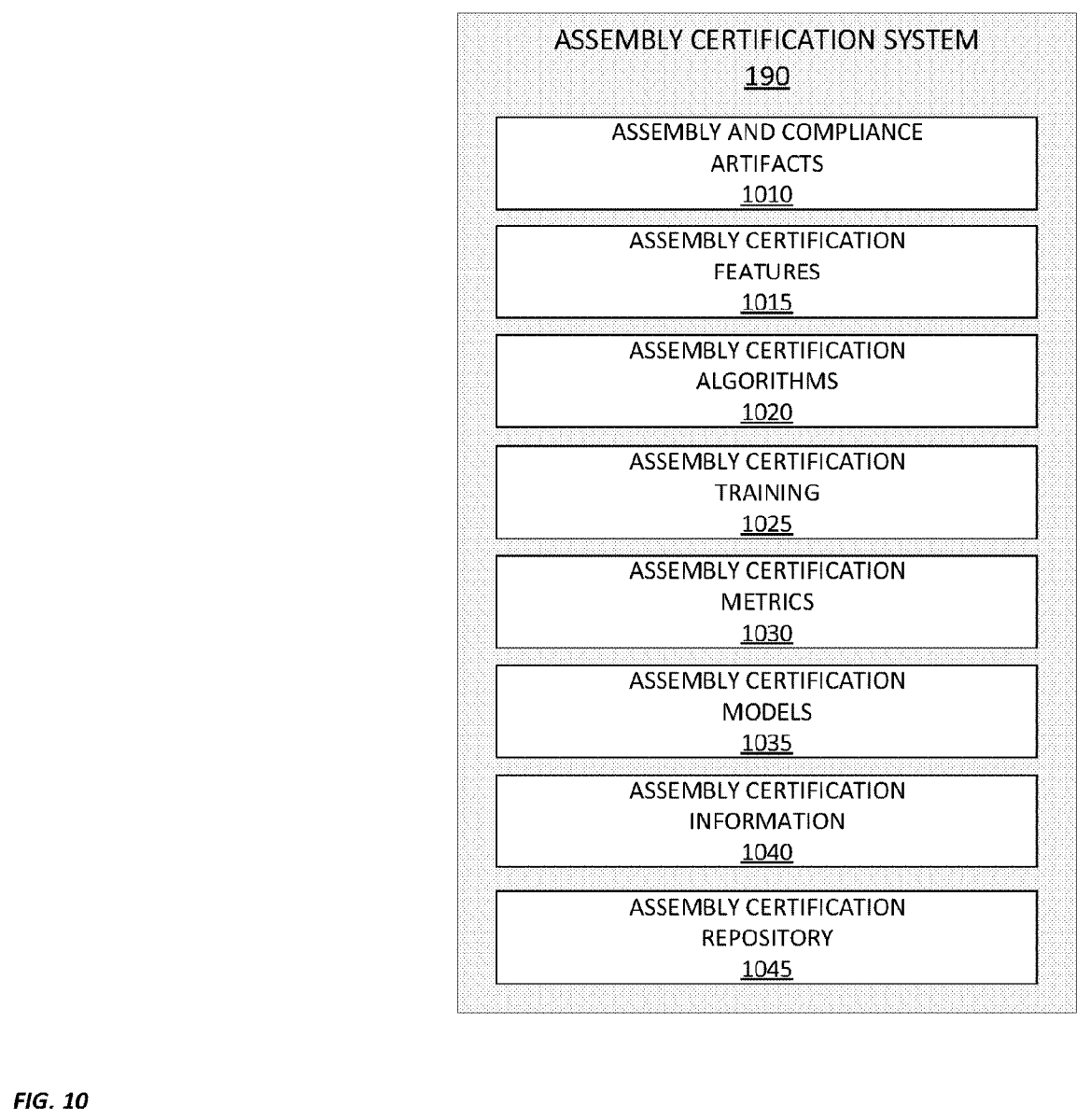

ASSEMBLY CERTIFICATION SYSTEM
190

ASSEMBLY AND COMPLIANCE ARTIFACTS
1010

ASSEMBLY CERTIFICATION FEATURES
1015

ASSEMBLY CERTIFICATION ALGORITHMS
1020

ASSEMBLY CERTIFICATION TRAINING
1025

ASSEMBLY CERTIFICATION METRICS
1030

ASSEMBLY CERTIFICATION MODELS
1035

ASSEMBLY CERTIFICATION INFORMATION
1040

ASSEMBLY CERTIFICATION REPOSITORY
1045

FIG. 10

Figure 11:
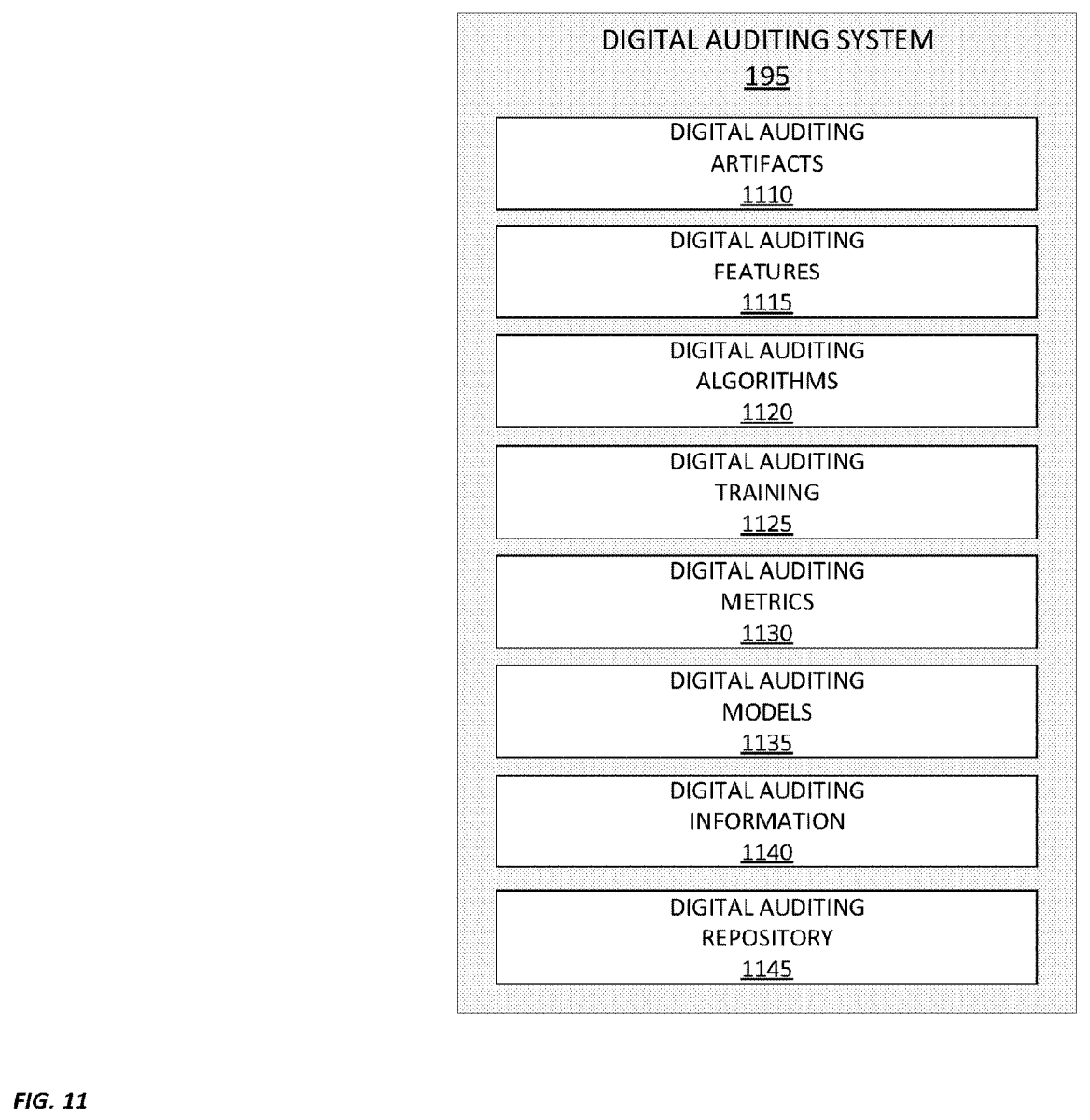

DIGITAL AUDITING SYSTEM
195

DIGITAL AUDITING
ARTIFACTS
1110

DIGITAL AUDITING
FEATURES
1115

DIGITAL AUDITING
ALGORITHMS
1120

DIGITAL AUDITING
TRAINING
1125

DIGITAL AUDITING
METRICS
1130

DIGITAL AUDITING
MODELS
1135

DIGITAL AUDITING
INFORMATION
1140

DIGITAL AUDITING
REPOSITORY
1145

ELECTRICAL EQUIPMENT MANAGEMENT

TECHNICAL FIELD

The present disclosure relates to energy management, and more particularly, to an electrical equipment management system.

PRIORITY CLAIM

This application claims priority to and benefit from the following provisional patent application: U.S. Provisional Application Ser. No. 63/055,938 titled "Electrical equipment Management System" filed on Jul. 24, 2020. The entire contents of this aforementioned patent application are expressly incorporated by reference herein.

BACKGROUND

Conventional factory-assembled switchboards typically come in a relatively limited number of configurations, and generally such factory assembled switchboards require a significant number of electrical busbars, usually made of copper, which may be very expensive. Further, such assemblies are generally assembled in a specialized factory setting and only by specialty trained technicians. A fully assembled switchboard may also be very large and very heavy, which means shipping to the job site from the specialized factory setting may be expensive and maneuvering to its final location at the job site may be very difficult. A completely assembled switchboard may also be more difficult for installers to wire since some components block or restrict areas of the switchboard where electrical connections must be made.

SUMMARY

In one embodiment, a method for electrical equipment management, comprises: upon receiving a login request from a user, validating the login request; receiving a selection of an order of an electrical equipment system to assemble and, in response, retrieving and providing a plurality of instructions; performing an iterative assembly process to manage the assembly of the electrical equipment system by the user, wherein the iterative assembly process comprises iterating through the plurality of instructions for assembling the electrical equipment; recording digital artifacts of the electrical equipment system during performance of the plurality instructions as part of the iterative assembly process; upon determining that compliance has been achieved for the assembled electrical equipment system based on the recorded digital artifacts satisfying a predefined compliance standard, recording a final assembly report for the electrical equipment system; and storing the final assembly report together with a unique identifier corresponding to the assembled electrical equipment system.

In another embodiment, a method for electrical equipment system management, comprises: receiving a selection of an order of an electrical equipment system to assemble and, in response, retrieving and providing an instruction; performing an assembly process to manage the assembly of the electrical equipment system by the user, wherein the assembly process comprises performing the instruction for assembling the electrical equipment system; recording digital artifacts of the electrical equipment system during performance of the instruction as part of the assembly process; upon determining the instruction has been completed based on the recorded digital artifacts satisfying a predefined compliance standard, determining a next instruction based on the completion of the assembly step and the recorded digital artifacts; retrieving and providing the next instruction based on the completion of the assembly step and the recorded digital artifacts; upon determining that compliance has been achieved for the assembled electrical equipment system based on the recorded digital artifacts satisfying a predefined compliance standard, recording a final assembly report for the electrical equipment system; and storing the final assembly report together with a unique identifier corresponding to the assembled electrical equipment system.

In another embodiment, An electrical equipment management system, comprising: one or more computer processors; and a non-transitory computer-readable memory containing computer program code that, when executed by operation of the one or more computer processors, performs an operation for managing data access within a first computing environment, the operation comprising: receiving a selection of an order of an electrical equipment system to assemble and, in response, retrieving and providing a plurality of instructions; performing an iterative assembly process to manage the assembly of the electrical equipment system by the user, wherein the iterative assembly process comprises iterating through the plurality of instructions for assembling the electrical equipment system; recording digital artifacts of the electrical equipment system during performance of the plurality instructions as part of the iterative assembly process; upon determining that compliance has been achieved for the assembled electrical equipment system based on the recorded digital artifacts satisfying a predefined compliance standard, recording a final assembly report for the electrical equipment system; and storing the final assembly report together with a unique identifier corresponding to the assembled electrical equipment system.

BRIEF DESCRIPTION OF THE DRAWINGS

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

Identical reference numerals have been used, where possible, to designate identical elements that are common to the figures. However, elements disclosed in one embodiment may be beneficially utilized on other embodiments without specific recitation.

FIG. 2 is a block diagram illustrating a system for achieving electrical equipment system equipment design certification, according to one embodiment described herein.

FIG. 3 is a block diagram illustrating a system for creating and managing customer electrical equipment system equipment designs, according to one embodiment described herein.

FIG. 6 is a block diagram illustrating a system for company information, authorization, and authentication, according to one embodiment described herein.

FIG. 7 is a block diagram illustrating a system for managing user and company training, according to one embodiment described herein.

FIG. 8 is a block diagram illustrating a system for managing equipment assembly instructions and execution of a electrical equipment system, according to one embodiment described herein.

FIG. 9 is a block diagram illustrating a system for managing electrical equipment system equipment compliance instructions and execution, according to one embodiment described herein.

FIG. 10 is a block diagram illustrating a system for achieving assembled electrical equipment system equipment certification, according to one embodiment described herein.

FIG. 11 is a block diagram illustrating a system for managing and executing digital auditing of assembled electrical equipment system equipment, according to one embodiment described herein.

DETAILED DESCRIPTION

Figure 1:
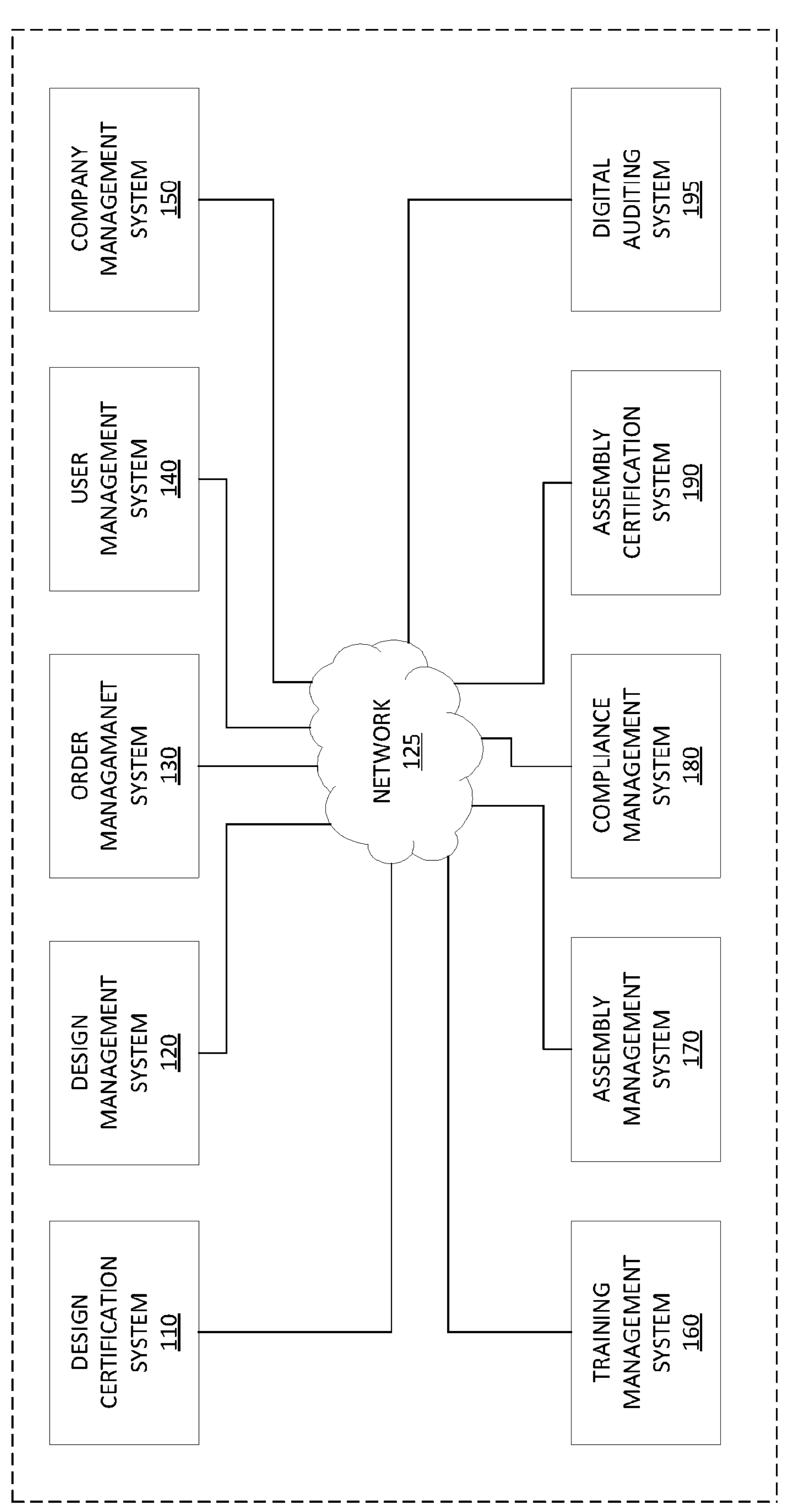
FIG. 1 is a block diagram illustrating a system for achieving end-to-end electrical equipment system digital regulatory compliance, according to one embodiment described herein.

Switchboard systems are used to safely distribute electricity throughout a variety of facilities including as residential, commercial, or industrial types. Switchboard systems are defined in the National Electric Code (NEC) as "A large single panel, frame, or assembly of panels on which are mounted on the face, back, or both, switches, overcurrent, and other protective devices, buses, and usually instruments. These assemblies are generally accessible from the rear as well as from the front and are not intended to be installed in cabinets" [NEC Chapter 1, Article 1]. Electrical equipment systems have modular components such that the switches, overcurrent, and other protective devices, buses, and instruments are serviceable by a trained technician allow a switchboard system to be configured for a particular application.

Conventional factory-assembled switchboards typically come in a relatively limited number of configurations. It should be appreciated these limited number of configurations may not be applicable to the very wide application space that switchboards may be applied to. Variations such as, but not limited to, size, shape, electrical rating, breaker configurations, and available instrumentation are important factors under consideration when selecting an electrical equipment for a particular application.

Generally, such factory assembled switchboards require a significant number of electrical busbars, usually made of copper, which may be very expensive. Further, such assemblies that are regulatory authority certified are generally assembled in a specialized factory setting and only by trained technicians. A fully assembled switchboard may also be very large and very heavy, which means shipping to the job site may be expensive and maneuvering to its final location at the job site may be very difficult. A completely assembled switchboard may also be more difficult for installers to wire since some components block or restrict areas of the switchboard where electrical connections must be made.

Such limitations in the manufacturing of existing factory assembled switchboard systems may create additional problems in the creation, assembly, and obtaining regulatory certification of custom electrical equipment. Factors such as the extended lead time, ability to accurately quote, availability of qualified facilities and technicians to assemble, and ability gain regulatory compliance on custom electrical equipment assemblies are key problems.

A solution to this challenge is the use of the disclosed systems and methods of electrical equipment management. Embodiments of such a system described herein, provide a user or system a method to order, assemble, and obtain regulatory compliance of custom electrical equipment assemblies. These assemblies need not be assembled in dedicated factories, but may be assembled in locations that have not typically been utilized for such switchboard assemblies, such as a local facility, or the customer site itself. Technicians for assembly of these modular systems are directed by a series of automated assembly instructions based on feedback from the technician, electrical equipment management system, or both. Such assemblies are created to meet several standards including manufacturing, operational, quality, and regulatory compliance standards. Completed electrical equipment assemblies may then be submitted for regulatory review in situ and approved via digital methodologies without a site visit necessary.

It should be appreciated that electrical distribution equipment may be considered a class or sub class of electrical equipment and for purposes of this disclosure are similar if not identical in some applications. Examples may include, but are not limited to, panelboards, circuit breakers, load boxes, and any complimentary equipment to facilitate the conduction of electricity.

FIG. 1 is a block diagram illustrating a system for achieving end-to-end electrical equipment digital regulatory compliance, according to one embodiment described herein. The electrical equipment management system 100 provide the ability to manage all aspects of achieving regulatory compliance and certification for an electrical equipment system, including, but not limited to, user access, user and company training, providing the ability to design, assemble, certification, achieve regulatory compliance, and order equipment. As illustrated, the electrical equipment management system 100 for digital regulatory compliance includes a design certification system 110, a design management system 120, an order management system 130, a user management system 140, a company management system 150, a training management system 160, an assembly management system 170, a compliance management system 180, an assembly certification system 190, and a digital auditing system 195. It should be appreciated these various systems may utilize one or more networks 125 of various architectures to facilitate communication between and within the various systems described herein.

It should be appreciated that the electrical equipment management system 100 may contain one or more components for storage of digital artifacts. For example, these digital artifacts may be historical, retained, or transient in nature as the system operates. Such a system may be used, for example, to recall information utilized for a present assembly of an electrical equipment system, or past assembly of an electrical equipment system. Further, such a system may be used to store artifacts relating to one or more modular assemblies such as documentation, drawings, instructions, certification history, measurements, or training artifacts. Multiple electrical equipment assemblies, or digital artifacts regarding one or more electrical equipment assemblies, may also be stored and recalled for analysis. Such analysis may include, for example, success or failure rate of a particular assembly or particular assembly step, number of times an assembly step has been processed.

FIG. 2 is a block diagram illustrating a system for design certification. The design certification system 110 includes design certification features 210, design certification algorithms 215, design certification training 220, design certification metrics 225, design certification models 230, engineering designs 235, certified designs 240, and a certified design repository 245.

Generally, design certification is the process and associated systems responsible for designs that when completed may become certified and are anticipated to complete regulatory compliance. A design certification feature component 210 may, for example, maintain all the features for a particular electrical equipment design. These features may include, but are not limited to power capacity, physical size, available circuits, or other characteristics relevant to electrical equipment assemblies.

Design certification algorithms 215, are algorithms utilized by the electrical equipment system to create certified designs for assembly. As one example, an algorithm may exist that for a particular physical dimensioned backplane, a particular series of specifically dimensioned breakers may be utilized. An additional example may be that particular power capacities may not be exceeded for specific components and coupling of these like power capacity devices may create a certified design.

Design certification training 220 may be utilized to obtain training specific to a design. These may include operational, installation, functional, or other training necessary to operate, maintain, or training to otherwise remain in service.

Design certification metrics 225 may include embodiments of equipment design metrics may include, but are not limited to, parameters utilized during the design of a electrical equipment system such as number and type of components, for example, breakers integrated into the design, characteristics of the design, for example, power capacity, physical characteristics of any enclosure, or other metrics which may be utilized for the creation of an electrical equipment design.

Design certification models 230 may include certified designs such as reference models as a starting point of a design which is certified. Other such design certification models may exist and be utilized in whole, in part, or in combination to assist a user or system to design a certified design.

An engineering design component 235 may be utilized by the design certification system 110 for those designs that are in the process of becoming certified designs. Engineering designs 235 and their components may be combined with certified designs 240 and their components or as standalone designs to create new designs or modify existing designs.

Certified designs 240, are designs that have completed the entire electrical equipment assembly process and have been determined to be designs that may be assembled, validated, and certified by a regulatory body. A certified design repository 245 stores such designs to be recalled in the future for use as a standalone design, combination of designs, or other use as determined by a user or system.

It should be appreciated that the design management system 110 may contain one or more components for storage of digital artifacts. For example, an equipment design history component which in embodiments, stores a history of electrical equipment designs that have been completed, a history of module switchboard designs that have failed to complete, or templates of electrical equipment designs that have yet to be assembled. It should be appreciated that all such embodiments may exist simultaneously.

FIG. 3 is a block diagram illustrating a system for design management. The design management system 120 includes certified design rules 310, certified design templates 315, a design user interface 320, design bill of materials 325, design diagram generation 330, and a design artifacts repository 335.

The design management system 120 is responsible for the overall design process. It should be appreciated that design elements may be provided by several sources that include, but are not limited to, engineering designs 235, certified designs 240, or the certified design repository 245. These design elements may include past and present designs, users, or other systems, such as an ERP, may initiate a design for a configuration. Design of a electrical equipment system may be accomplished through the entry of parts, subassemblies, assemblies, complete designs, reference numbers to such assemblies, drawings, such as schematics, one line, mechanical, or text descriptions. With this design information, the equipment design component may develop a design and associated documentation, such as, for example, a Bill of Materials (BOM) from which a modular assembly system may be fabricated.

A certified design rules component 310, is utilized to design a solution which comports to a set of design standards to produce a design that may be produced to a manufacturing, quality, or regulatory standard.

Certified design templates 315, may include templates of certified designs such as reference models as a starting point of a design which is certified. Other such design certification models may exist and be utilized in whole, in part, or in combination to assist a user or system to design a certified design in template format. A design user interface 320 is provided to a user or system to receive feedback and allow input into the system.

A design Bill Of Materials (BOM) 325, may be generated as part of the design process to facilitate creation of a listing of parts to be used for a design. This listing may be shared electronically with an ERP system to see what materials are available or alternatively, what timeframe they may become so. In this way the system may also suggest alternate design choices that allow a design to be completed, however with available materials to eliminate or reduce lead time issues.

During the process of creating a design a design diagram generation 330 may fabricate drawings of the assembly including, for example, mechanical drawings, line drawings, schematic drawings, reference drawings, CAD drawings, assembly drawings, or other drawings which may be used by a user, contractor, technician, assembler, system, or installer of the electrical equipment.

A design artifacts repository 335 contemplate an equipment design drawings repository may include drawings, including types such as, but not limited to, mechanical, electrical, schematic, or reference drawings of electrical equipment designs that have been completed, module switchboard drawings that have failed to complete, or templates of electrical equipment drawings that have yet to be assembled.

It should be appreciated that the design management system 120 may contain one or more components for storage of digital artifacts. A technical documentation component data repository that may include text, pictures, video, drawings of an existing catalog of technical documentation, which in embodiments, stores a history of electrical equipment technical documentation that have been completed, a history of module switchboard technical documentation that have failed to complete, or templates of electrical equipment technical documentation that have yet to be executed. Such a data repository may also include technical documentation that have failed, succeeded, or not attempted. It should be appreciated that all such embodiments may exist simultaneously.

Figure 4:
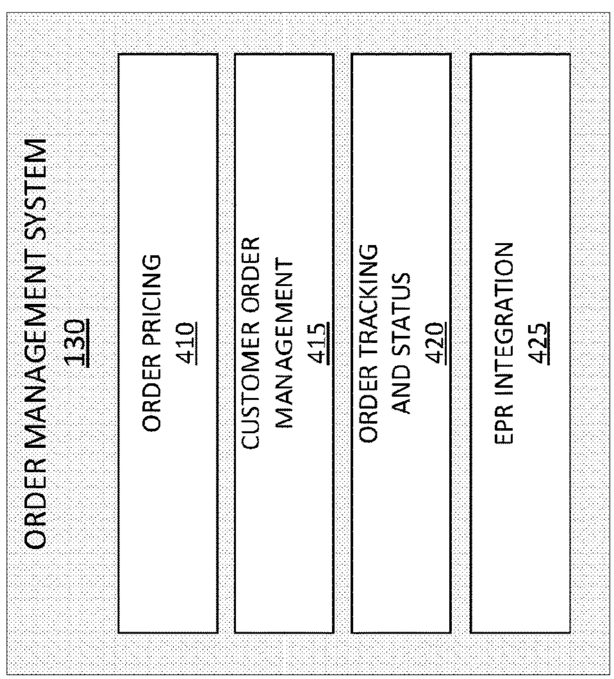
FIG. 4 is a block diagram illustrating a system for creating and managing customer electrical equipment system orders, according to one embodiment described herein.

FIG. 4 is a block diagram illustrating a system for order management. The order management system 130 includes order pricing 410, customer order management 415, order tracking and status 420, and Enterprise Resource Planning (ERP) integration 425. It should be appreciated orders may be placed by a user, a system, or some combination, individually or in bulk. Orders may be entire assemblies, partial assemblies, a combination of parts, or some combination thereof to form an assembly. Assemblies may be items that are present available, e.g. in-stock switchboard systems, or items that require additional configuration to assemble, e.g. custom switchboard systems.

The order management system 130 includes an order pricing component 410. Embodiments of this order pricing component include, but are not limited to, pricing of units based on available stock of switchboard assemblies, available stock of parts to create switchboard assemblies, raw materials, production capacity, orders, pricing of parts, components, or assemblies, or purchase orders.

A customer order management component 415 and an order tracking and status component 420, in embodiments, may be utilized to manage the linkage between, for example, the supply of switchboard assemblies, parts, and raw materials with the demand for completed switchboard assemblies. This component may progress as an order progresses allowing a manufacturer, supplier, partner, or customer track progress of a switchboard assembly.

It should be appreciated that an Enterprise Resource Planning (ERP) integration component 425 may exist in the electrical equipment system to collect, store, manage, and interpret data. An ERP may be integrated into or separate information available to the order management system 130 and embodiments illustrate such a system may track various resources such as available stock of switchboard assemblies, available stock of parts to create switchboard assemblies, raw materials, production capacity, orders, and purchase orders.

It should be appreciated that the order management system 130 may contain one or more components for storage of digital artifacts. For example, an order history component data repository may include an existing catalog of electrical equipment orders, which in embodiments, stores a history of electrical equipment orders that have been completed, a history of module switchboard orders that have failed to complete, or templates of electrical equipment orders that have yet to be executed. Such a data repository may also include orders status in an effort to determine necessary materials and manpower for planning purposes. Additionally, such a module may project future order placements based on past orders. It should be appreciated that all such embodiments may exist simultaneously.

Figure 5:
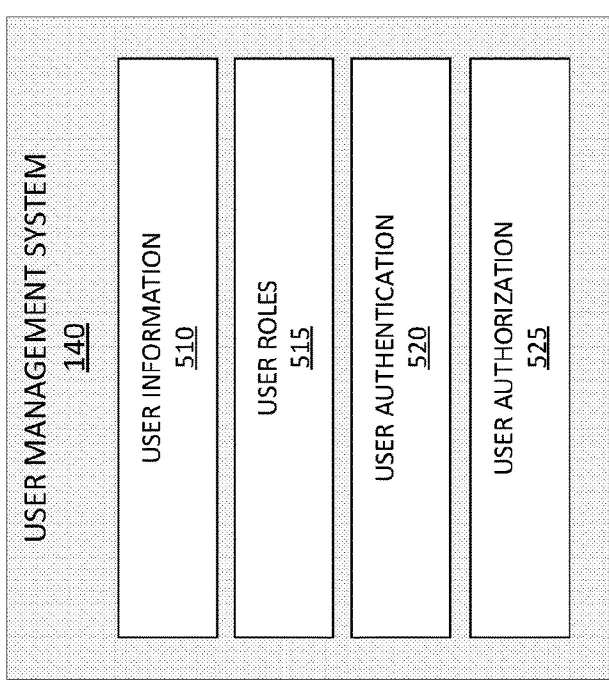
FIG. 5 is a block diagram illustrating a system for managing user information, authorization, and authentication, according to one embodiment described herein.

FIG. 5 is a block diagram illustrating a system for managing users. The user management system 140 includes user information 510, user roles 515, user authentication 520, and user authorization 525. Examples of this system may include a system to manage users and their relevant information of what user or system would be authenticated to gain access to the electrical equipment management system 100. Examples of user management system may include systems such as, Active Directory (AD), Remote Authentication Dial-In User Service (RADIUS), or Lightweight Directory Access Protocol (LDAP).

Management of users includes the storage and ability to change users and their associated characteristics or user information 510, such as, for example, a username and associated password or passphrase, or security questions. A user role 515 may indicate a level of access allowed to a particular user or group of users. For example, a user may have complete rights to the system and as such be named an "administrator" or more limited rights as a "user."

In general authentication is the process of identifying a user, company, or systems identity. Authorization is the process of determining what level of access or abilities a user, company, or system may utilize once authenticated.

A user authentication component 520, may include, but is not limited to, single factor, two-factor, or multi-factor authentication systems. Methods to achieve authentication may include, but are not limited to, username/password combinations, one time passwords, Single Sign On (SSO), or biometric factor methods such as fingerprints.

A user authorization component 525, may include, but is not limited to, role based access control, web tokens, Security Assertion Markup Language (SAML) exchange, or API authorization calls.

General examples of user management system include Active Directory (AD), Remote Authentication Dial-In User Service (RADIUS), or Lightweight Directory Access Protocol (LDAP).

FIG. 6 is a block diagram illustrating a system for managing companies. The company management system 150 includes company information 610, company roles 615, company authentication 620, and company authorization 625.

It should be appreciated the company management system 150, performs many of the same functions as the user management system. However, one difference between the user management system 150 and the company management system 160 is a partner organization (e.g. a company) must be authorized first, and then authorized users must be associated with an authorized partner organization. It should be appreciated that different companies and their associated users may have different levels of authorization than the company granting the access and authorization.

Another distinguishing characteristic between user and company what entity is responsible for the authentication and authorization. As an example, a parent company may authenticate and authorize a user employed by that company. If, however a 3*rd* party company may provide, for example, manufacturing support, not only does the parent company have to authenticate and authorize the site, but also the site must be authorized and authenticated by any 3*rd* party certification authority (e.g. U.L.).

FIG. 7 is a block diagram illustrating a system for managing training for users and companies. The training management system 160 includes company training plans 710, company training material 715, a company training repository 720, user training plans 725, user training material 730, and a user training repository 735. It should be appreciated that training of users and companies may come in a variety of forms that include, but is not limited to, instructor lead training, computer based learning, simulation, hands on, lectures, group discussions, or off-line activity, e.g. user study. Training topics may include, but are not limited to, assembly, quality or manufacturing procedures, or regulatory procedures of electrical equipment systems.

The training management system 160 may include a user or company training management component. Such a system may be utilized for the administration, documentation, tracking, reporting, automation and delivery of educational courses, or training programs for a user or group of users. In this way the user training management system may be an example of a Learning Management System (LMS) specific to the electrical equipment management system 100.

A company training plan 710 and user training plan 725 components may contain information regarding training delivery, available training materials, or other management of training, similar to delivery by an LMS as indicated in the user or company training component.

A company training material 715 and user training material 730 as distinct from company and user training plans 710, 725 respectively consist of, for example, the procedures utilized to train users in a variety of roles, such as, but not limited to, administrators, assemblers, quality control technicians, or regulatory inspectors.

A company training repository 720 and a user training repository 735 may store both plans specific to the respective company and user to be utilized during training. It may also store both company training metrics and user training metrics. Embodiments may include, training for a user or company which have been attempted, completed, failed, or proscribed for a user, group of users, company, or group of companies (e.g. local, regional, global). Training metrics may also include certifications, qualifications, or regulatory standards a user, group of users, company, or group of companies, may require, be required, or possess.

A company training history may include training history for a manufacturing site, which in embodiments, stores a history of the training that has been attempted at a manufacturing site, a history of the training that has been completed at a manufacturing site, a history of the training that has failed at a manufacturing site, a history of the training that has been proscribed for a manufacturing site. A site training history component may also include certifications, qualifications, or regulatory standards a site may require or possess. It should be appreciated that all such embodiments may exist simultaneously.

A user training history may include training history for a user or a group of users, which in embodiments, stores a history of the training that has been attempted by a user, a history of the training that has been completed by a user, a history of the training that has failed by a user, a history of the training that has been proscribed for a user. A user training history component may also include certifications, qualifications, or regulatory standards a user may require or possess. It should be appreciated that all such embodiments may exist simultaneously. It should be appreciated that all such embodiments may exist simultaneously.

FIG. 8 is a block diagram illustrating a system for managing assembly of equipment. The assembly management system 170 includes assembly instruction management 810, assembly execution management 815, an assembly artifacts repository 820, assembly features 825, assembly algorithms 830, assembly training 835, assembly metric 840, and assembly models 845. Each of these components is responsible for the execution of the assembly, quality control, and regulatory instructions, respectively, for each component. It should be appreciated this execution need not be completed for each module for proceeding to the next module.

It should be appreciated that quality control and quality control standards may be included as part of the assembly process and may include, but are not limited to, verification of one or more quality or manufacturing standards through inspection or test. Standards may verify electrical, mechanical, assembly, aesthetic, or other such standards. Such standards may include company, local, regional, national, or international standards and may be from a standards body, e.g. ISO, or derived specifically by a manufacturer or even specific to a customer or customer company specifications.

The assembly management system 170 includes an assembly instruction management component 810 where for a given electrical equipment assembly a set of assembly instructions is managed for the user or system. These instructions may include the use of particular tools, and may further include the calibration of those tools to assure regulatory standards. This management may include the creation, presentation, and sequencing of assembly instructions for an electrical equipment. Further an integration exists with, for example, the design management system 120 which may provide appropriate drawings to the assembly management system, order management system 130 which may request a user to select particular parts for a next step in an assembly operation, or assembly metrics module 840 to pause at particular operations or to repeat particular inspections to allow the electrical equipment assembly system to capture and store relevant assembly metrics.

An assembly execution management module 815 is provided to manage the execution of assembly instructions for a given electrical equipment assembly. In various embodiments a series of assembly instructions are provided to an assembly instruction management component 810 where for a given electrical equipment assembly a set of assembly instructions is managed for the user or system and passed to an assembly execution management module 815 for execution. This management may include the creation, presentation, and sequencing of assembly or quality instructions for an electrical equipment. Further an integration exists with, for example, the design management system 120 which may provide appropriate drawings to the quality management system for a user to perform a visual inspection. Further such instructions may be directed to an automated test system, such as an Automated Test Equipment (ATE) or a computer vision system, to perform automated quality checks on the electrical equipment system being assembled. A further integration may exist with an assembly metrics module 840 to pause at particular operations or to repeat particular inspections to allow the electrical equipment assembly system to capture and store relevant assembly metrics.

It should be appreciated that the assembly management system 810 may contain one or more components for storage of digital assembly artifacts 820. An assembly artifacts repository may include an existing catalog of assembly steps or instructions, which in embodiments, stores a history of electrical equipment assembly steps that have been completed, a history of module switchboard assembly steps that have failed to complete, or templates of electrical equipment assembly steps that have yet to be executed. Such a data repository may also include assembly steps that have failed, succeeded, or not attempted. It should be appreciated that all such embodiments may exist simultaneously.

Assembly features 825 are features utilized by the electrical equipment system to create certified designs for assembly. As one example, a series of assembly characteristics may be specific to a particular design such as torque requirements, venue considerations, tools used (e.g. wireless torque wrench), or other characteristic that would be particular to the assembly of the electrical equipment system.

Assembly algorithms 830 are algorithms utilized by the electrical equipment system to create certified designs for assembly. As one example, an algorithm may exist that for a particular physical dimensioned backplane, a particular series of specifically dimensioned breakers may be utilized. An additional example may be that particular power capacities may not be exceeded for specific components and coupling of these like power capacity devices may create a certified design.

Assembly training 835, may be utilized to obtain training specific to the assembly of a design. These may include operational, installation, functional, or other training necessary to operate, maintain, or training to otherwise remain in service.

An assembly metrics component 840 may include, but are not limited to, parameters utilized during the assembly of an electrical equipment system such as torque, stiffness, power, current, resistance, user inspection verification, or other metrics which may be utilized for the assembly of an electrical equipment design.

Design certification models 230 may include certified designs such as reference models as a starting point of a design which is certified. Other such design certification models may exist and be utilized in whole, in part, or in combination to assist a user or system to design a certified design.

FIG. 9 is a block diagram illustrating a system for managing assembly compliance and quality. The compliance control system 180 includes compliance instruction management 910, which in various embodiments provides for instructions regarding compliance of electrical equipment management. Instructions may include but are not limited to instructions required to complete quality or compliance tests which may be conducted by a user, company, Automatic Test Equipment, or some combination there of. It should be appreciated that various users, user groups, or companies, may be utilized to facilitate these instructions.

Compliance execution management 915 includes the

A compliance artifacts repository 920,

A compliance feature 925, are features utilized by the electrical equipment system to create certified designs which meet a compliance standard. As one example, a series of compliance characteristics may be specific to a particular design such as regulatory body, country, region, or other characteristic that would be particular to the compliance of the electrical equipment system.

Compliance algorithms 930, are algorithms utilized by the electrical equipment system to create certified designs which will establish a certified design. As one example, an algorithm may exist that for a particular country certification standard (e.g. UL, CE, CCC). An additional example may be regional characteristics of compliance that would be highly beneficial to meet to establish a design that meets those regional compliance standards.

Compliance training 935 may be utilized to obtain training specific to the compliance of a design. These may include operational, installation, functional, or other training necessary to operate, maintain, or training to otherwise obtain regulatory compliance. It should be appreciated that various users may perform this training and testing. While a regulatory body is ultimately responsible for creating, transmitting, and verifying the affixing of a regulatory mark, other groups may perform a series of regulator tests to assure the actual regulatory testing will be successful.

Compliance metrics 940, may include, but are not limited to, parameters utilized during the compliance of an electrical equipment system such as regulatory agency, stiffness, power, current, resistance, user inspection verification, or other metrics which may be utilized for the compliance of an electrical equipment design.

Compliance models 945. may include certified compliance models or designs such as compliance reference models as a starting point of a design which is certified and has an established compliance record. Other such compliance certification models may exist and be utilized in whole, in part, or in combination to assist a user or system to design a certified design that will ultimately result in regulatory compliance.

FIG. 10 is a block diagram illustrating a system for managing assembly certification. The assembly certification system 190 includes assembly artifacts 1010, assembly certification features 1015, assembly certification algorithms 1020, assembly certification training 1025, assembly certification metrics 1030, assembly certification models 1035, assembly certification information 1040, and an assembly certification repository 1045. It should be appreciated the system for managing assembly certification are described in further detail in the various embodiments contained herein.

FIG. 11 is a block diagram illustrating a system for executing digital auditing for assembled equipment. The digital auditing system 200 includes digital auditing artifacts 2010, digital auditing features 2015, digital auditing algorithms 2020, digital auditing training 2025, digital auditing metrics 2030, digital auditing models 2035, a digital auditing repository 2040, and digital auditing external integrations 2045. It should be appreciated the system for managing digital auditing for assembled equipment are described in further detail in the various embodiments contained herein.

According to one embodiment described herein, an engineering equipment design may first be created and certified through the design certification system 110. Once completed, the design management system 120 may interactively design the equipment based on user or system inputs, while ensuring rules and characteristics of the certified engineering design are achieved. The design diagram generation component 1225 renders illustrations of the resulting equipment throughout the interactive design process. Once a design is complete, it may be processed by the order management system 130 where the order pricing component 410 generates a cost estimate for fulfilling the order. When an order has purchased, shipped, and arrives at the user's location, design information is passed to digital systems in order to guide the user through kit identification and selection, assembly of the equipment, and quality control tests necessary to ensure safety and reliability. Once equipment has completed the assembly and compliance workflow, an equipment certification may be generated for the specific equipment from the assembly certification system 190. Additionally, digital artifacts may be generated throughout the process of designing, ordering, and assembling the equipment. These artifacts may be captured in a master data repository and digitally linked to the equipment. This traceability may be accessible through digital tools, that may allow users to view the history of the equipment at any time.

The design certification system 110 generally provides the ability to design and certify equipment engineering designs through the use of advanced technologies. As one of many examples, use of design certification features 210, design certification algorithms 215, design certification training 220, design certification metrics 225, and design certification models 230, the electrical equipment management system may evaluate submitted engineering designs 235 using Artificial Intelligence (AI), and create a certified design 240 or provide feedback regarding changes required before certification may be met. Once a design has been certified, it is recorded in a certified design repository 245 where the design and design rules may be accessed by other systems.

The design management system 120 provides a set of digital tools to guide users or systems through design of the equipment, based on the certified designs stored within the design certification system 110. As one example, through the design user interface 320, users may specify needs and design parameters and have the option to start a new design based on certified design rules 310, or to use an existing certified design template 315. Once the design has been completed, the design bill of materials 325 is created and the design diagram generation component 330 handles creation of computer-aided design (CAD) drawings that may be digitally linked to the equipment and accessible by the user via digital means at any time in the future. The design diagram generation 330 component also may also create a digital representation of the system that identifies the unique kits required to complete the assembly of the equipment. The final design is stored in the design artifacts repository 335 to ensure the design is accessible throughout the life of the equipment. Key metrics taken from design management may be used to optimize the designs. The design management system 30 may use these metrics and optimizations to provide users with recommendations for equipment designs that best meet their needs based on the set of inputs. Users may also be able to optimize created designs based on characteristics, such as highest performance and lowest cost.

The order management system 130 generally provides the ability price, purchase, and track shipment of a given equipment design and equipment components. For example, once a user finalizes a design through the design management system 160, the design is transferred to the order management system 130. Pricing is provided for the design through the order pricing component 410. The ERP integration component 425 may integrate with Enterprise Resource Planning systems to display inventory information and ensure component availability within the order. The user may use customer order management 415 to purchase the order and the order tracking and status component 420 may provide the user with status and updates regarding the shipment and delivery of the components.

The user management system 140 generally provides user identification and security services. For example, user information is entered and stored within the user information component 510 and user roles are managed through the user roles component 515. To manage access to digital services and components, a user may be required to login based on their unique credentials. The user may be authenticated and authorized through the user authentication component 520 and the user authorization component 520.

The company management system 150 generally provides the ability generally provides company identification and security services. For example, company information is entered and stored within the company information component 610 and company roles are managed through the company roles component 615. After this has been accomplished, authorized users managed within the user management system 140 may be associated with authorized companies. To manage access to digital services and components, a user may be required to login based on their unique credentials. The user may be authenticated and authorized, and then the company may be authenticated and authorized through the company authentication component 620 and the company authorization component 625.

The training management system 160 generally provides the functions to train both companies and users to use the necessary digital systems and assemble certified equipment. For example, company training plans and material may be generated and stored in the company training plans component 710 and company training material component 715. Results from company training execution and completion may be digitally stored in the company training repository 720. Similarly, user training plans and materials may be generated and storied in the user training plans component 725 and user training material component 730. Results from user training execution and completion may be digitally stored in the user training repository 735. Records of the plans may be linked to the user management system 140 and company management system 150 to ensure training has been completed before access to the system is provided.

The assembly management system 170 generally provides the capabilities to manage the assembly of the equipment. For example, assembly instruction management 810 may be linked to parts used in the design of the equipment and managed through digital systems. A rules engine may be used to sequence the assembly instructions to ensure the equipment is built to meet the user design. According to one embodiment described herein, instructions that may be provided to the user include part selection, where Information generated from the design may identify the unique parts, and by using technologies like QR codes and scanners as well as deep learning and image recognition, kits may be pulled from inventory and brought to a designed location to begin assembly. Instructions steps also engineering drawings, pictures, animations, videos, and other suitable forms of content may be used to demonstrate how to accomplish the step. Additionally, augmented reality may provide users additional visual information to guide proper placement of kits within the assembly. Once assembly instructions have been compiled, assembly execution management 815 may manage and facilitate the assembly workflow. Digital artifacts collected during the assembly process may be stored in the assembly artifacts repository 820. Artificial intelligence (AI) may be used to improve and optimize assembly instructions and assembly execution. Using assembly features 825, assembly algorithms 830, assembly training 835, assembly metrics 840, and assembly models 845, we may improve assembly efficiency through the use of advanced technologies. AI methods may include image recognition to detect and process key characteristics and machine vision to capture and analyze both the equipment and assembler to ensure requirements were met. The technologies may identify issues during the process and determine engineering changes to the process or design of the equipment in order to improve quality, safety, or ease of assembly.

It should be appreciated "machine learning" in this context is an umbrella term designed to capture digital artifacts utilizing imaging-based systems comprising one or more image sensors. Embodiments include Augmented Reality (AR) or Virtual Reality (VR) systems to capture one or more images. Further, the one or more identified images from such systems are further processed utilizing a digital image processing system. Embodiments include Optical Character Recognition (OCR) or deep learning systems, generally, to process such images for further analysis of these digital images to produce digital artifacts to be utilized by the electrical equipment management system 100. Metrics captured as part of this system may be used by the electrical equipment management system 100 to create actions, such as assembly, inspection, regulatory, or verification instructions.

The compliance management system 180 generally provides the capabilities to manage and ensure safety and quality of the equipment through the assembly process. For example, compliance instruction management 910 provides instructions to be executed throughout the assembly process to verify and validate critical quality items. A rules engine may be used to sequence the compliance instructions to ensure the equipment is built to meet certification requirements. Once compliance instructions have been compiled, compliance execution management 915 may manage and facilitate the compliance workflow. The execution of a compliance step may require multiple parts (e.g., two parts). In one embodiment, the first part of the process is for a user to acknowledge that the step has been completed (e.g., by entering user input into a connected computing device). In such an embodiment, the second part of the process is for the compliance execution component 915 to ensure that the step has been completed. In doing so, the compliance execution component 915 may examine digital records including pictures of the assembly step, videos of activities conducted during the step, and integration with digital assembly tools to collect required measurements, such as torque. Additional digital records may include augmented reality along with image recognition, which may be used to verify correct parts have been used, that parts are in the correct location and orientation, and ensure the presence of all required bolts within the assembly. Digital artifacts collected during the compliance process may be stored in the compliance artifacts repository 920. Artificial intelligence (AI) may be used to improve and optimize compliance instructions and assembly execution. Using compliance features 925, compliance algorithms 930, compliance training 935, compliance metrics 940, and compliance models 945, we may improve assembly quality and safety through the use of advanced technologies. AI methods may include predictive analysis of data artifacts, image recognition to detect and process key characteristics, and machine vision to capture and analyze both the equipment and assembler to ensure requirements were met.

The assembly certification system 190 generally provides the capability to certify the assembled equipment to ensure it meets requirements set forth by various standards and regulations organizations. For example, the system may use assembly and compliance artifacts 1010 collected from the equipment assembly and compliance workflow. Artificial intelligence (AI) provided by assembly certification feature 1015, assembly certification algorithms 1020, assembly certification training 1025, assembly certification metrics 1030, and assembly certification models 1035 may use these artifacts to ensure standards and regulations requirements are achieved. AI methods may include predictive analysis of data artifacts, image recognition to detect and process key characteristics, and machine vision to capture and analyze both the equipment and assembler to ensure requirements were met. Once it has been verified standards and regulations have been achieved, assembly certification information 1040 may be generated and provided for the equipment and stored in the assembly certification repository 1045.

The digital auditing system 195 generally provides the ability to analyze and audit the assembly and compliance artifacts to ensure rules and requirements were followed during the assembly and compliance workflow. For example, the system may use digital auditing artifacts 1110 collected from the equipment assembly and compliance workflow. Artificial intelligence (AI) provided by digital auditing feature 1115, digital auditing algorithms 1120, digital auditing training 1125, digital auditing metrics 1130, and digital auditing models 1135 may use these artifacts to ensure rule and requirements were followed. AI methods may include predictive analysis of data artifacts, image recognition to detect and process key characteristics, and machine vision to capture and analyze both the equipment components and assembler actions during the assembly and compliance workflow. Results from digital auditing may be stored in the digital auditing repository 1140 and made accessible through digital auditing external integrations 1145 for required external groups.

Generally, systems described herein may be used to manage qualified companies and users, including groups of companies and users. Embodiments may manage authentication and authorization for both companies and users, including groups of companies and users. In one embodiment, for users to receive access to the necessary systems, the users may complete training and certification to ensure they may properly design, assemble, and conduct quality control tests for the equipment. This training could include sections on how to use required tools, including digital tools, how to conduct the assembly process including calibration and use of tools and how to conduct the quality control process include calibration and use of tools. In a particular embodiment, each location managing the assembly and quality control process may have required training and certification to ensure the location is providing appropriate service. It should be appreciated that users, groups of users, companies, or groups of companies may also require or possess regulatory certifications (e.g., ISO 100001) which may be required to authorize the ordering, assembly, and certification of switchboard systems.

Figure 12:
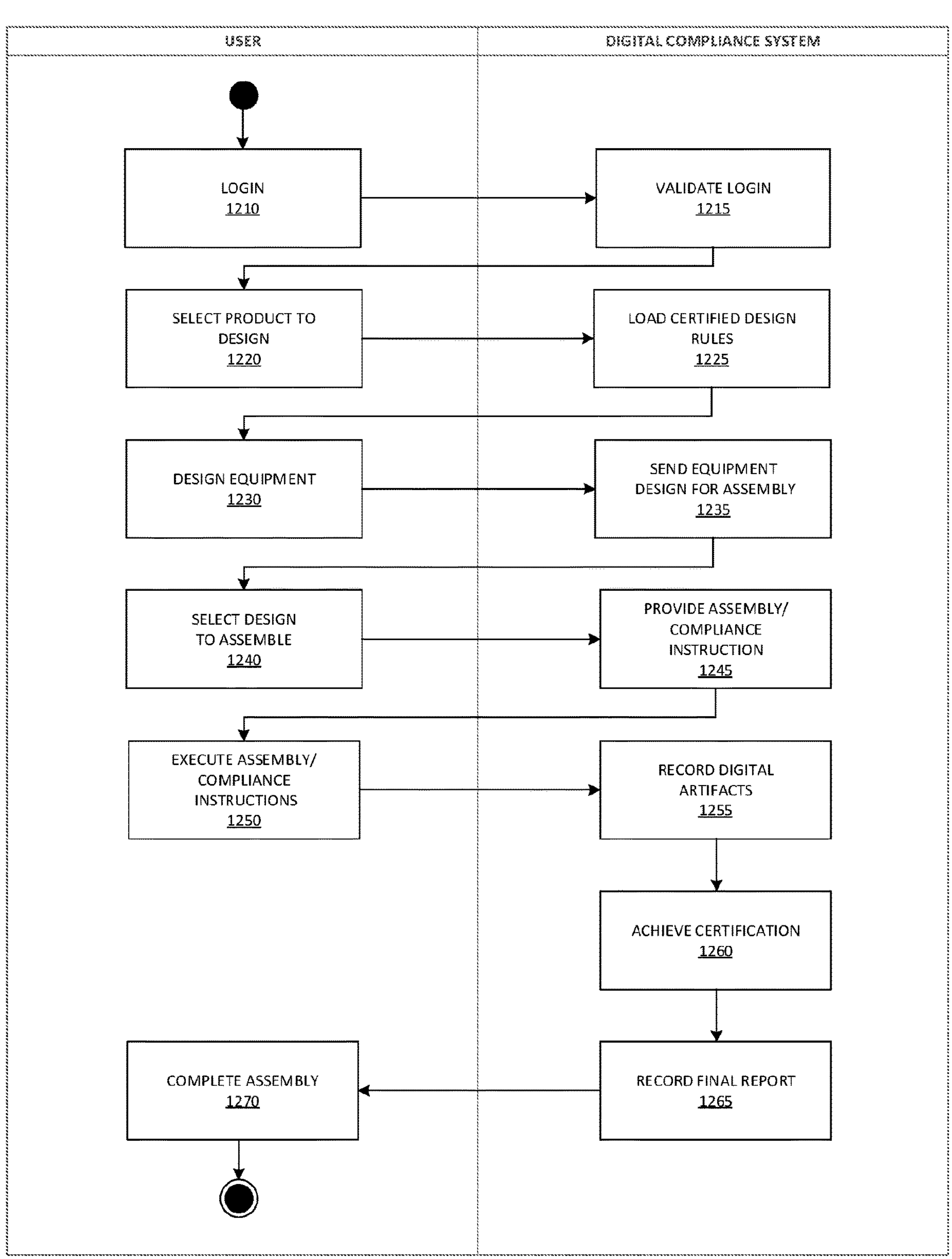
FIG. 12 is a flow diagram illustrating a method of managing and executing electrical equipment system equipment design, assembly, and certification according to one embodiment described herein.

FIG. 12 is a flow diagram illustrating embodiments of a method of managing equipment assembly, according to one embodiment described herein. As shown, the method 1200 begins at block 1210, where a user or system may login to the electrical equipment compliance system. The electrical equipment compliance system may then validate the login (block 1215). The user or system may then select which product or equipment to design (block 1220). The electrical equipment compliance system may load the certified design rules (block 1225) and then the user or system may design the equipment (block 1230) to meet their needs. The electrical equipment compliance system may then send the completed digital design for assembly (block 1235). The user or system may then select a design to assemble (block 1240). The electrical equipment compliance system may then provide the necessary assembly and quality control instructions to the user or system (block 1245). The user or system may execute the assembly and quality control instructions (block 1250) and the electrical equipment compliance system may record digital artifacts (block 1255) collected during the assembly and compliance workflow. The electrical equipment compliance system may then digitally achieve certification (block 1260) before generating the final report (block 1265). At the conclusion of these steps, the user or system may complete the assembly (block 1270).

Figure 13:
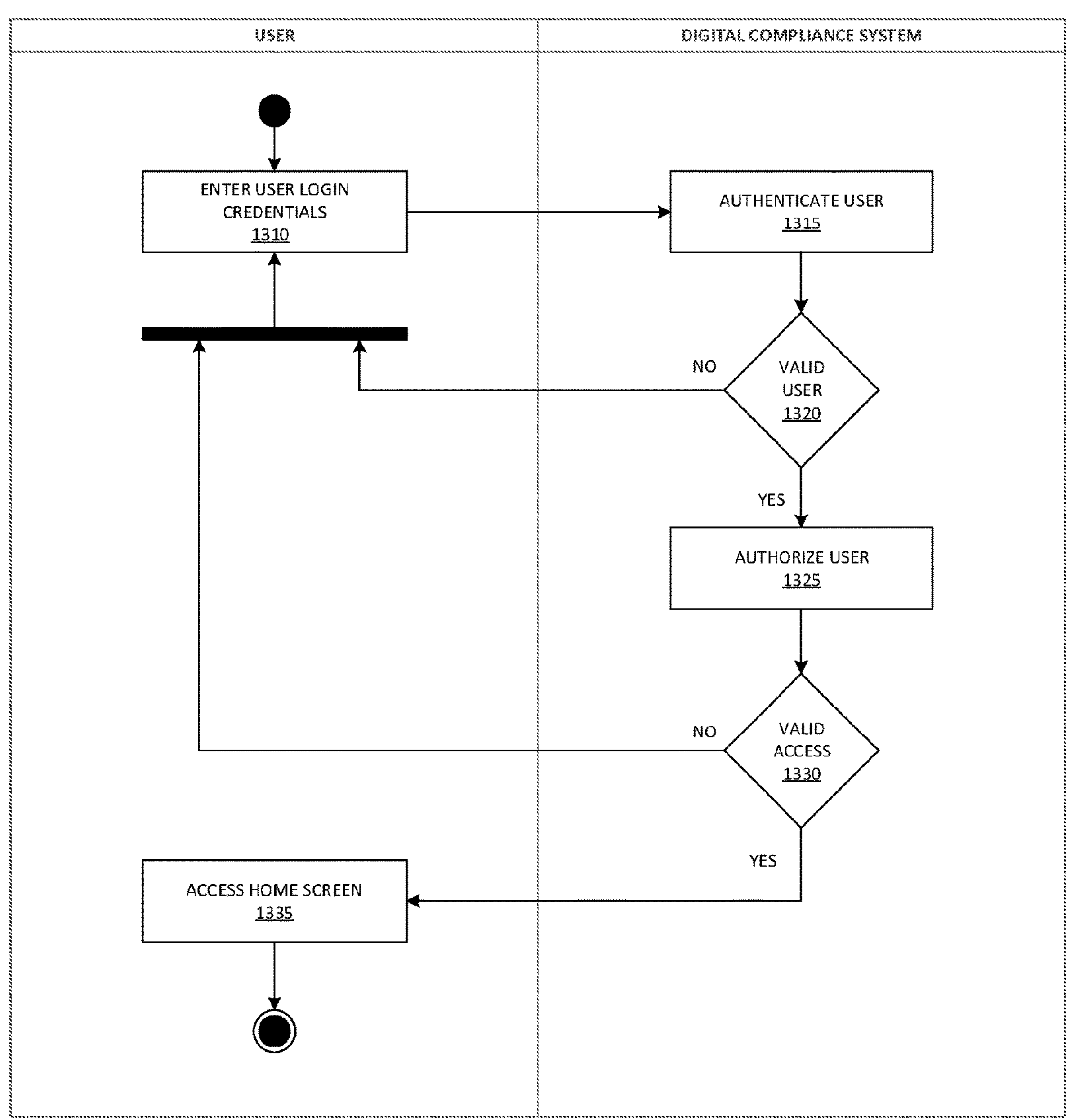
FIG. 13 is a flow diagram illustrating a method for user authentication and authorization, according to one embodiment described herein.

FIG. 13 is a flow diagram illustrating embodiments of a method for user or system authentication and authorization. As shown, the method 1300 begins at block 1310 where a user may login to the system using secure credentials. It should be appreciated a user may not be required for operation of the electrical equipment compliance system and autonomous access may be granted from another system. The electrical equipment compliance system may then authenticate the user (block 1315). Examples of authentication may include, but are not limited to, single factor, two-factor, or multi-factor authentication systems. Methods to achieve authentication may include, but are not limited to, username/password combinations, one-time passwords, Single Sign On (SSO), or biometric factor methods such as fingerprints.

If authentication is successful, the electrical equipment compliance system may then authorize the user (block 1325). The user authentication and authorization functions may be performed by the user management system 140. Once user authentication and authorization has been completed, the user may then access the home screen of the digital systems (block 1335). Examples of a user authorization may include, but is not limited to, role-based access control, web tokens, Security Assertion Markup Language (SAML) exchange, or API authorization calls.

Figure 14:
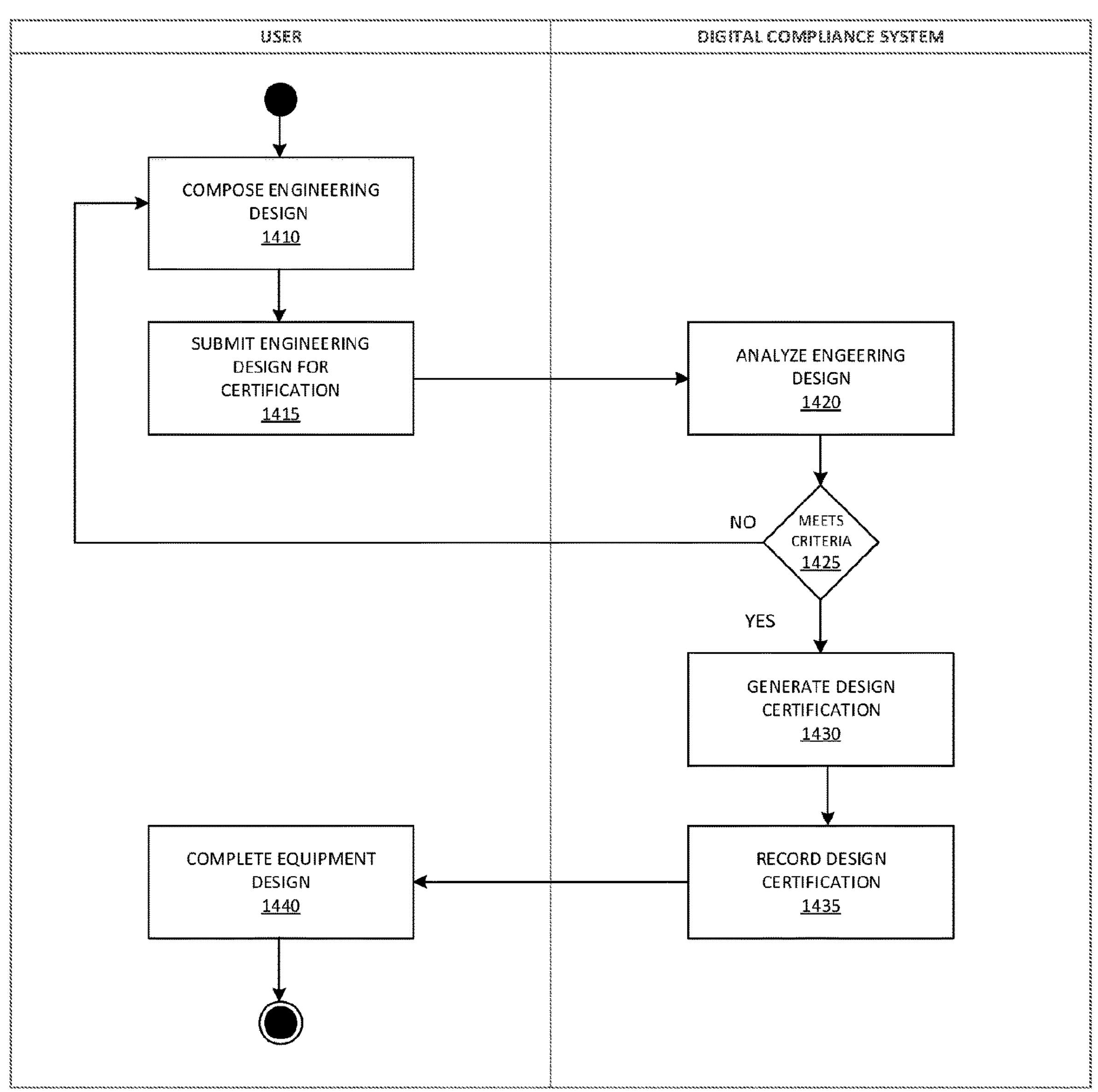
FIG. 14 is a flow diagram illustrating a method of creating and certifying electrical equipment system engineering equipment designs, according to one embodiment described herein.

FIG. 14 is a flow diagram illustrating embodiments of a method for composing and certifying an engineering equipment design through digital means. As shown, the method 1400 begins at block 1410 where an engineering design may be created using computer aided design (CAD) or other such design tools. The completed design would be submitted for certification (block 1415). The system may then analyze the submitted design (block 1420) to ensure the required codes and standards are achieved through the design. Once the design has been certified, the system may generate a design certification (block 1430) and then record the design certification (block 1435). The user may then complete the equipment design at the conclusion of the certification process (block 1440).

Figure 15:
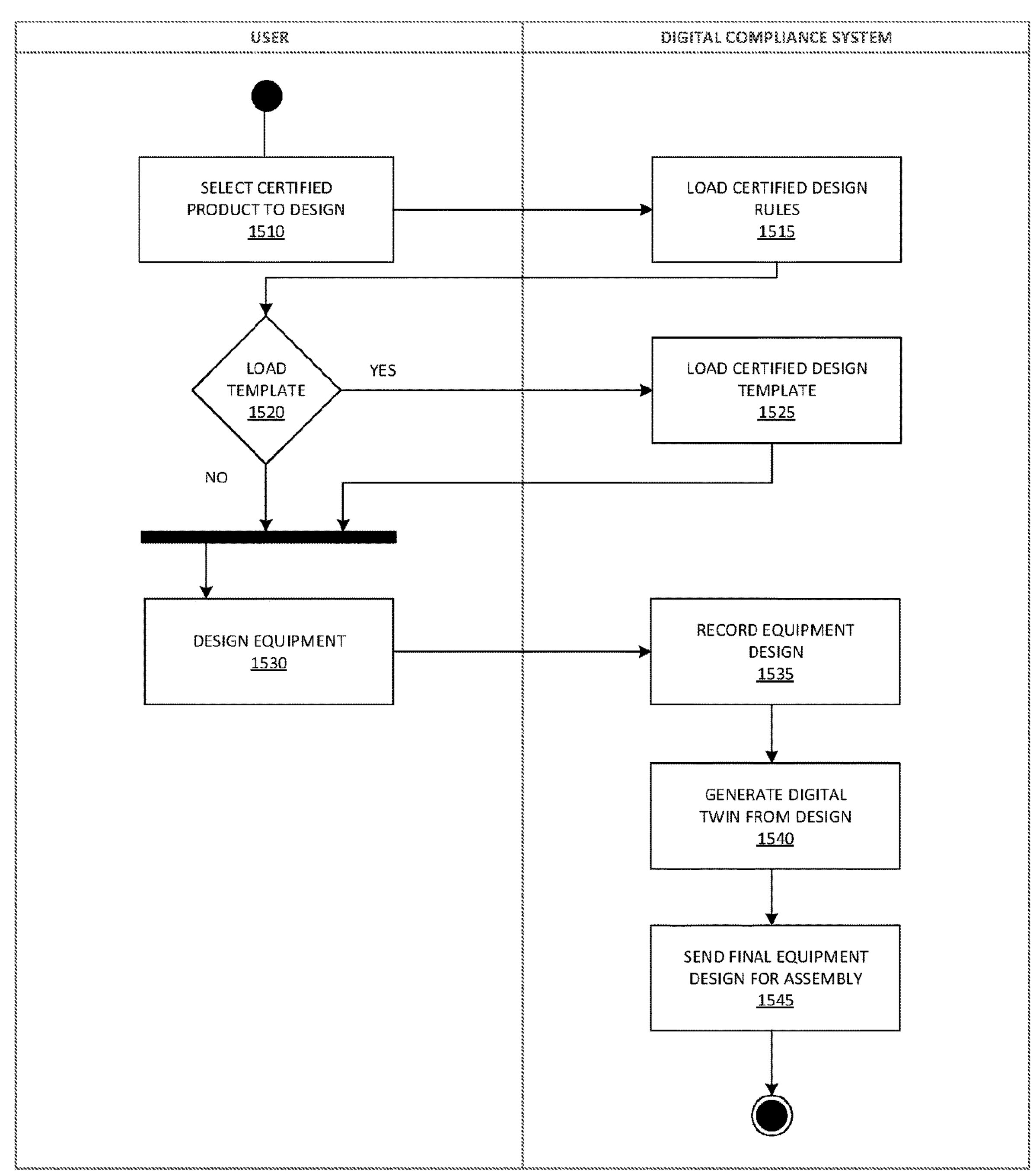
FIG. 15 is a flow diagram illustrating a method of creating new customer electrical equipment system equipment designs based on certified engineering rules, according to one embodiment described herein.

FIG. 15 is a flow diagram illustrating embodiments of a method for creating a user equipment design based on certified design rules. As shown, the method 1500 begins at block 1510 where the user may select a certified equipment design to begin customization. The system may load the certified design rules (block 1515) that are generated and managed from the design certification system 110. The user may have the option to begin the design from an existing certified design template, or other design source, that they system may load (block 1525) and provide to the user. The user may also design the equipment, or customize a design from an existing template, by specifying needs and parameters (block 1530). Once the user equipment design has been completed, the electrical equipment compliance system may record the final design (block 1535), generate a digital twin matching the user design (block 1540), and then send digital design information for assembly (block 1545).

Figure 16:
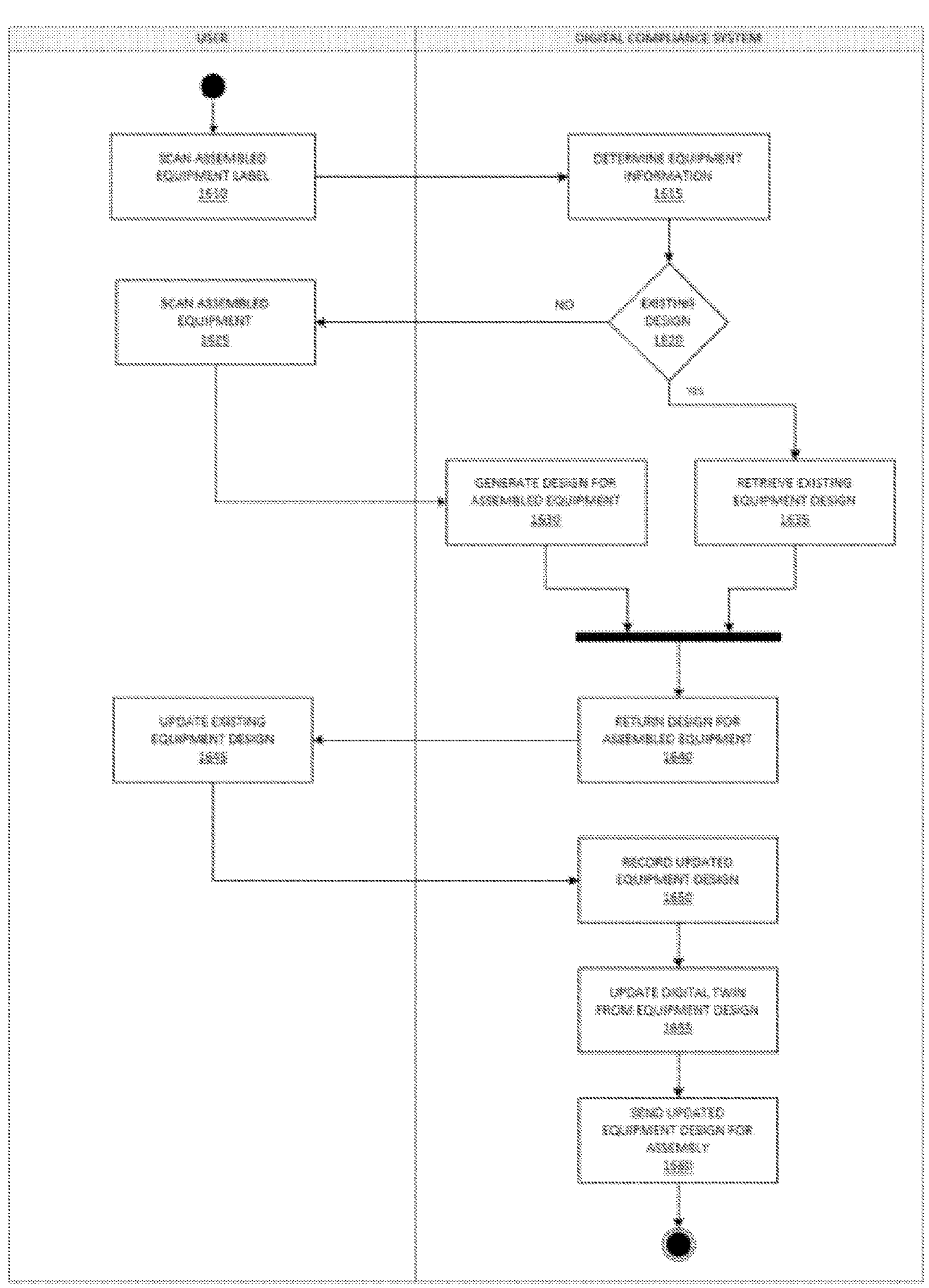
FIG. 16 is a flow diagram illustrating a method of updating electrical equipment system equipment designs based on previously assembled equipment, according to one embodiment described herein.

FIG. 16 is a flow diagram illustrating embodiments of a method for determining and updating an assembled equipment design. As shown, the method 1600 begins at block 1610 where a user may scan the assembled equipment label or other appropriate fiducial. The electrical equipment compliance system may use label information to retrieve any existing digital design information (block 1635). If a digital design does not exist for the assembled equipment, the user may scan the equipment features (block 1625) using the electrical equipment compliance system. Using artificial intelligence (AI), for example, including machine learning, image recognition, and machine vision, the electrical equipment compliance system may determine the components and features of the equipment and generate a corresponding design (block 1630). The existing design may be provided to the user (block 1640) where the user may then use digital tools to update the existing design to address new needs and parameters (block 1645). Once the user has completed the updated design, the updated design is digitally recorded (block 1650), a digital twin or other appropriate representation is generated or updated (block 1655), and the information is sent to manage the updated assembly and compliance process (block 1660).

Figure 17:
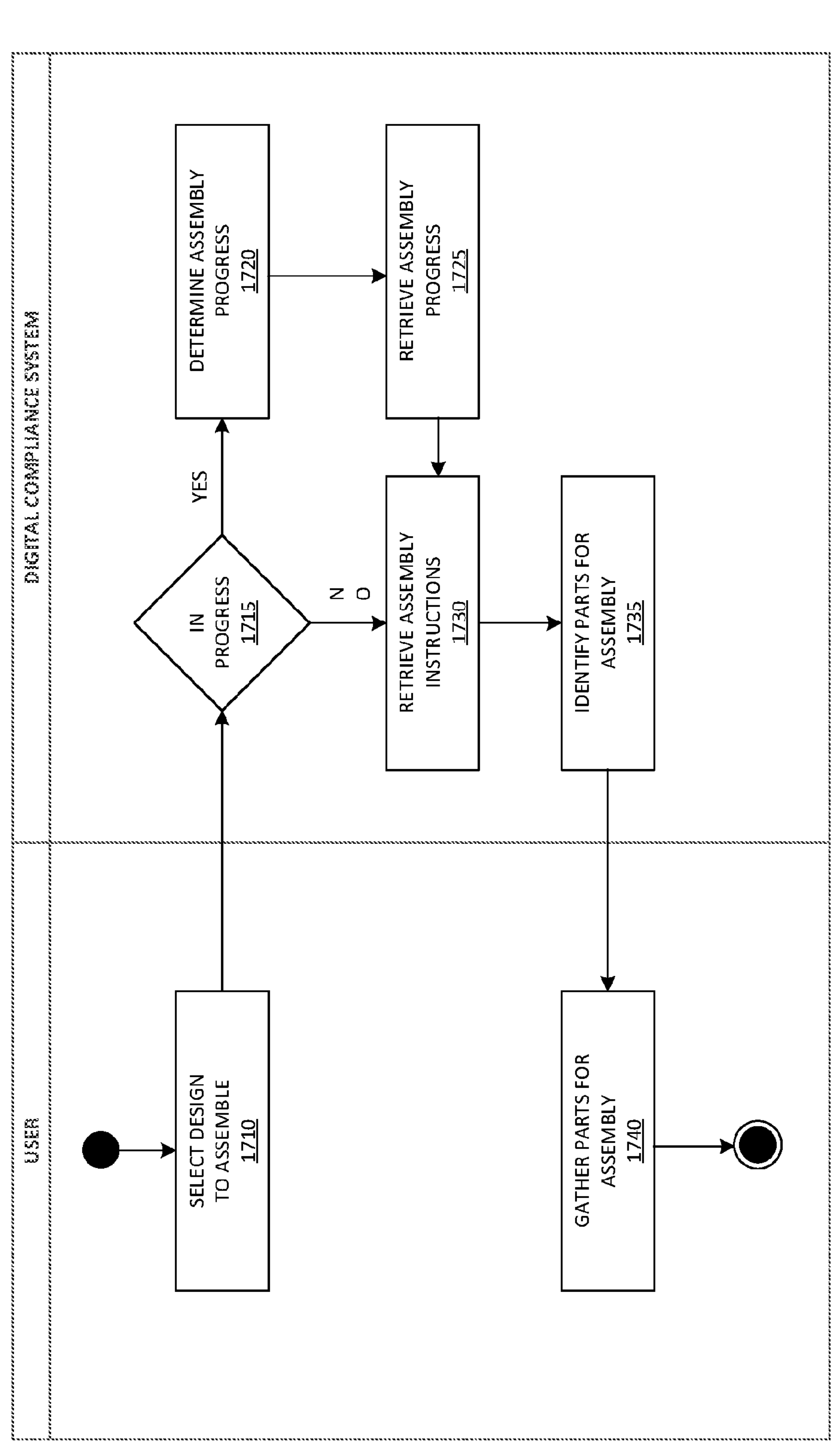
FIG. 17 is a flow diagram illustrating a method for selection of design and parts to begin electrical equipment system assembly, according to one embodiment described herein.
Figure 18:
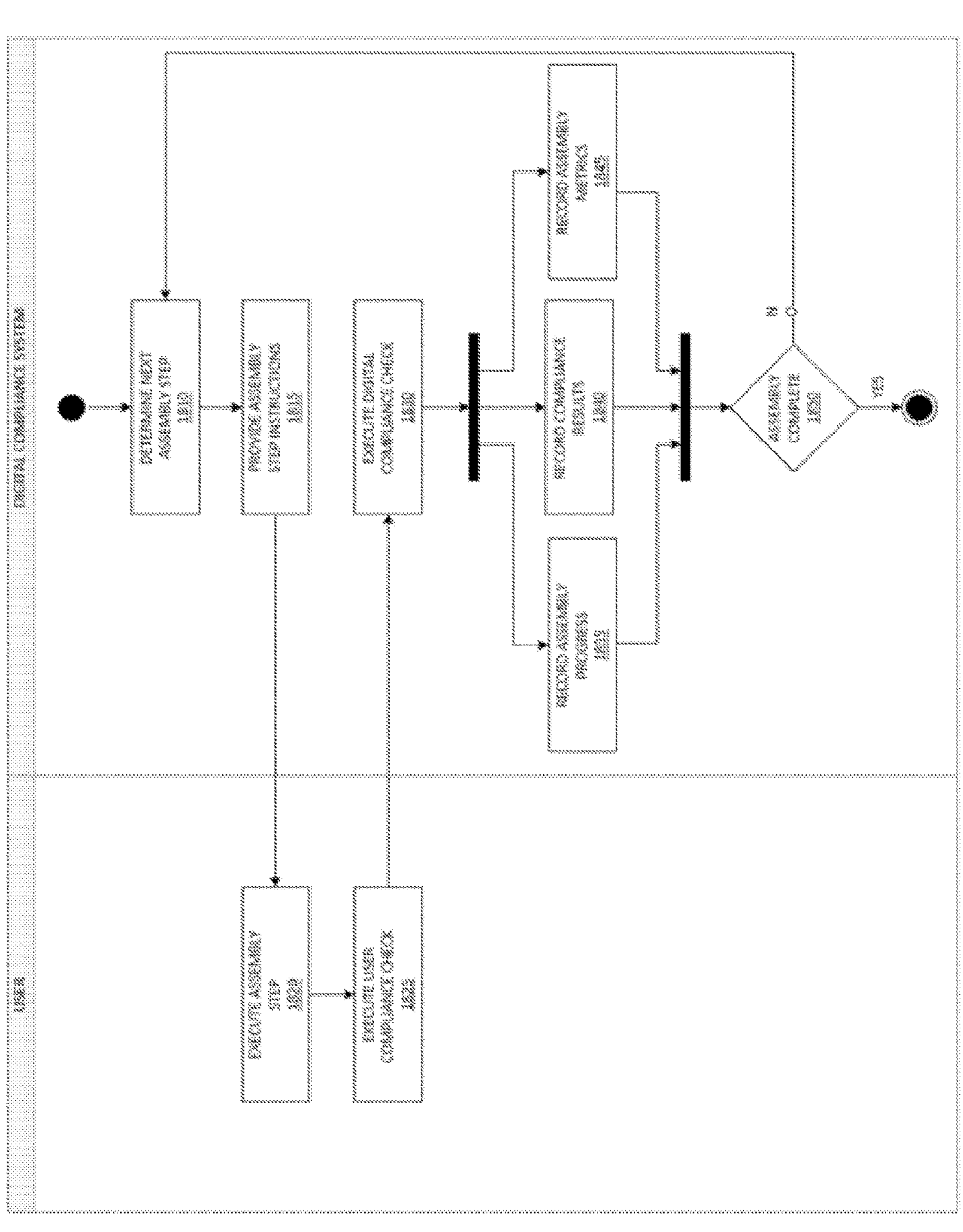
FIG. 18 is a flow diagram illustrating a method for execution for electrical equipment system equipment assembly and compliance, according to one embodiment described herein.

FIG. 17 is a flow diagram illustrating embodiments of a method for selection of design to begin assembly. The method 1700 begins at block 1710 where a user selects the design, which may include a complete assembly or partial design to assemble. In response, the system determines whether an existing equipment assembly for the selected design has been started (block 1715). If so, the electrical equipment compliance system determines the progress of the existing assembly (block 1720) and retrieves data for the existing assembly (block 1725). Once the existing assembly data is retrieved or if the system determines that no existing assembly exists, the system retrieves assembly instructions for the selected design (block 1730). Additionally, the system identifies the necessary parts to use for the assembly (block 1735). Once the electrical equipment compliance system indicates the parts necessary, a user may gather the parts before starting assembly (block 1740).

FIG. 9 is a flow diagram illustrating embodiments of a method for execution for equipment assembly and compliance This process may occur after a user has been authenticated and authorized and after the user has selected a design to assemble. Method 900 begins at block 910 where the electrical equipment compliance system determines the next step of the assembly and provide the next assembly or compliance instruction to the user via a human computer interface (block 915). The user, following the provided instructions, executes the next step of the assembly (block 920) and performs one or more user compliance operations to verify the assembly step was performed correctly (block 925). Similarly, the digital assembly and compliance system executes a digital quality control operation (block 930). In doing so, the system records the assembly progress (block 935), records compliance results from one or more compliance operations (block 940) and records assembly metrics (block 945). At block 950, the system determines whether the assembly is complete or whether additional assembly steps remain. If the assembly is not complete, the method 900 returns to block 910, where the system determines the next assembly step. If the assembly is compute, the method 900 exits the assembly and quality control flow.

Figure 19:
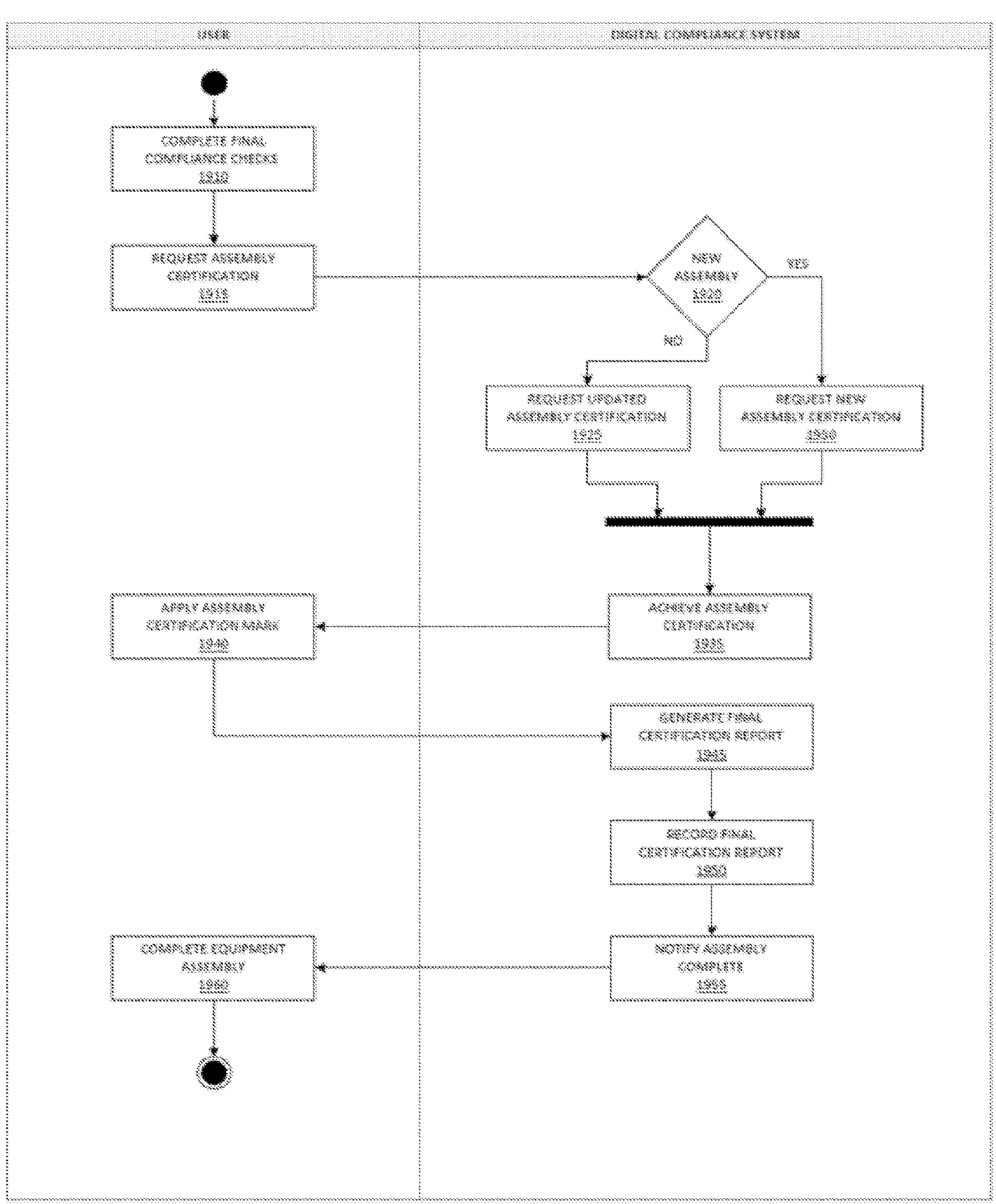
FIG. 19 is a flow diagram illustrating a method for acquiring a certification mark through digital means for an electrical equipment system, according to one embodiment described herein.

FIG. 19 is a flow diagram illustrating embodiments of a method for acquiring a certification mark through digital means. The method 1900 beings at block 1910 where a user completes a final compliance checks and then initiates a digital request for an assembly certification mark (block 1915). The electrical equipment compliance system may determine based on assembly information whether this is a new assembly or whether this is an update of an existing assembly (block 1919). If the equipment assembly has been updated from a previous design, a renewed assembly certification may be requested (block 1925). Otherwise, a new assembly certification may be requested (block 1930) for the equipment. At the completion of this activity, the system may achieve certification (block 1935) and return the certification mark to the user for it to be printed and applied to the equipment (block 1940. A final report is then generated (block 1945) and recorded (block 1950) including results from the assembly and compliance process. The electrical equipment compliance system then generates a notification that the assembly has been completed (block 1955) and a user completes the assembly process (block 1960).

Figure 20:
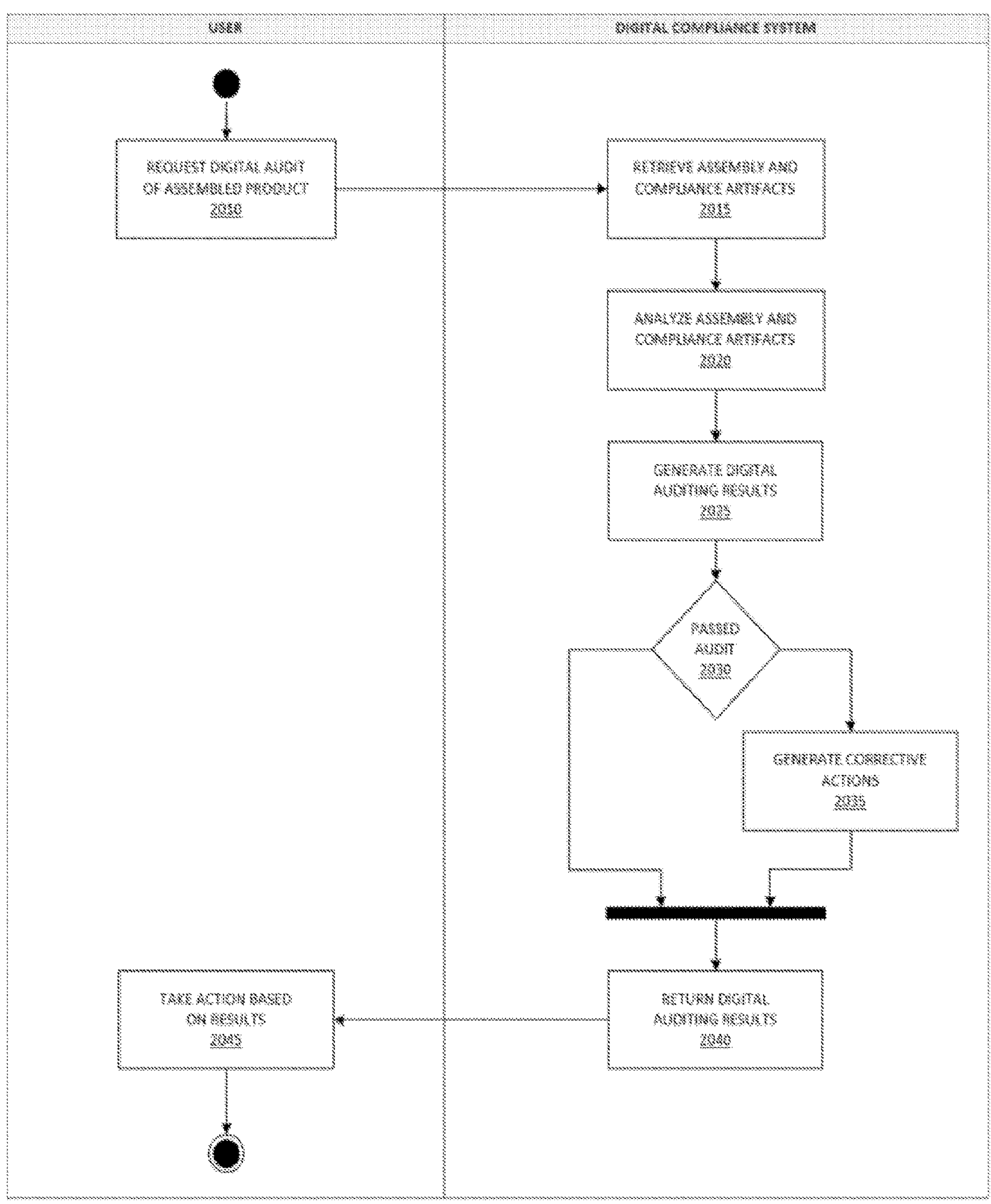
FIG. 20 is a flow diagram illustrating a method for auditing electrical equipment system equipment assembly and compliance through digital means, according to one embodiment described herein.

FIG. 20 is a flow diagram illustrating embodiments of a method for auditing equipment assembly and compliance activities via digital means. The method 2000 begins at block 2010 where the user may request a digital audit for a previously assembled and certified equipment. The electrical equipment compliance system may then retrieve assembly and compliance artifacts corresponding with the equipment (block 2015) and analyze these artifacts to determine if all activities were completed successfully (block 2020). The system may then generate digital auditing results (block 2025). If the system determines the audit was not successful (block 2030), corrective actions may be generated (block 2035) and included with the digital auditing results that are returned to the user (block 2040). Based on the results of the digital audit, the user may take the necessary actions (block 2045).

Figure 21:
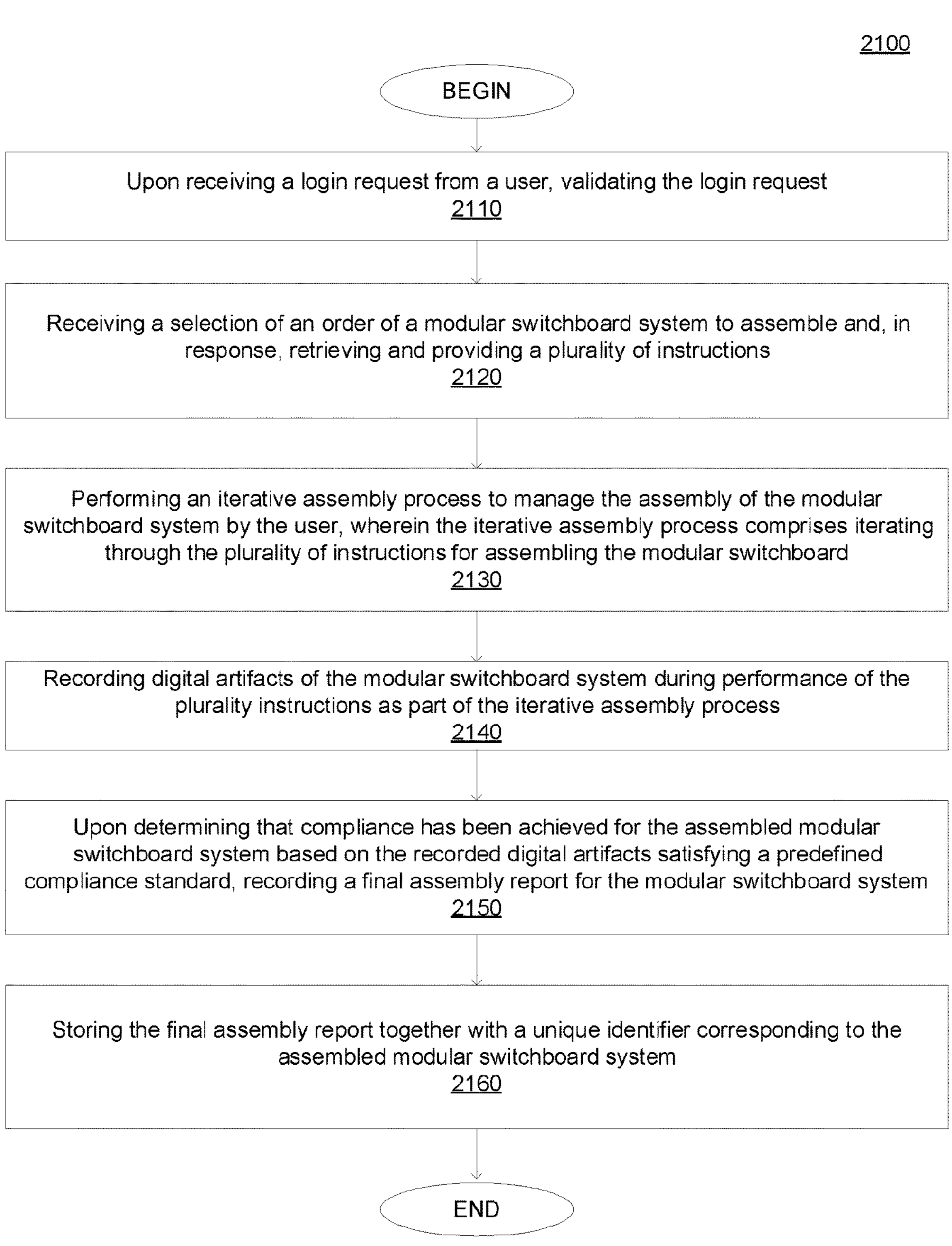
FIG. 21 is a flow diagram illustrating a method for achieving end-to-end electrical equipment system digital regulatory compliance, according to one embodiment described herein.

FIG. 21 is a flow diagram illustrating embodiments of a method for acquiring assembling a electrical equipment assembly and acquiring a compliance mark through digital means. The method begins as block 2110 where upon receiving a login request from a user, that login request is validated. It should be appreciated embodiments contemplate that a user is not required to begin this method, one or more systems, for example, an ERP as discussed herein.

Once a user or system is authenticated and authorized to proceed, block 2119 describes receiving a selection of an order of an electrical equipment system to assemble and, in response, retrieving and providing a plurality of instructions. Embodiments contemplate an order being entered by a user, a series of users, or received from a system, such as an EPR system, or other customer facing system to select a electrical equipment assembly.

Embodiments further contemplate a user being guided through a series of device choices to create an electrical equipment that has components which are compatible with each other. Also, a user may be guided with other product selectors to create an electrical equipment with particular characteristics such as power capacity, physical size, available circuits, or other characteristics relevant to electrical equipment assemblies.

Once the design is established block 2130 performs an iterative assembly process to manage the assembly of the electrical equipment system by the user, wherein the iterative assembly process comprises iterating through the plurality of instructions for assembling the electrical equipment. It should be appreciated the assembly process may include not only assembly steps, but also quality assurance checks, as well as regulatory verifications throughout the assembly process.

In one illustrative example, a user may be presented with a step or series of steps to fasten one bus bar to another utilizing torquing bolts. A user may be presented with a step first to calibrate a torque wrench and enter metrology data into the electrical equipment assembly system 100. Once complete, a user may then be instructed to tighten each torque bolt to a particular specification that is captured by the system. Once these assembly instructions are complete, a user may be instructed to place a paint mark across each both to indicate if a bolt head had been tampered with or as an indicator if the bolt has changed specification. This quality step may also be entered into the electrical equipment assembly system 100. Finally, a user may then be instructed to take a connectivity measurement utilizing an ohmmeter and enter the measurement as part of a regulatory step and enter the value into electrical equipment assembly system 100. In this way assembly, quality, manufacturing standards, and regulatory instructions may be conducted in parallel during the assembly of an electrical equipment assembly.

During the assembly process various data in the form of digital artifacts becomes available. Block 2140 performs recording digital artifacts of the electrical equipment system during performance of the plurality instructions as part of the iterative assembly process. Digital artifacts may be, for example, data collected from instruments direct into the system, such as voltage, current, power, measured directly from an ATE. Other examples provide entering data from a user at one or more terminals or from one or more instruments such as entering a torque value from a wrench that the assembler is using to fasten torque bolts. In other cases, this digital artifact may be an acknowledgement from a user that a particular instructed step has been completed, such as the marking of a bolt to indicate tightening has been completed. It should also be appreciated that examples of digital artifacts include, but are not limited to, datum created by machine vision system. In one example, a machine vision system may inspect the presence or absence of bolts which utilize visual torque value indicators. Based on this information additional assembly instructions or alternate assembly instructions may be presented to the user or system. It should also be appreciated that these digital artifacts may be stored and recalled into memory for future use and utilized as a basis to optimize or otherwise enhance the operation of the electrical equipment assembly system 100.

Once an assembly is completed according to the assembly steps and relevant digital artifacts collected block 2150 determines that compliance has been achieved for the assembled electrical equipment system based on the recorded digital artifacts satisfying a predefined compliance standard and records a final assembly report for the electrical equipment system. It should be appreciated one or more standards may be satisfied throughout the assembly process based on standards set at the commencement of the process. These standards include but are not limited to assembly standards, manufacturing standards, operational quality standards, or regulatory standards. It should be appreciated these standards may be directed by parties other than the electrical equipment assembly system 100 operator. Examples may include, but are not limited to regulatory standards such as, ISO, UL, FCC, CE, or CCC.

In various embodiments, regulatory data collected throughout the assembly and qualification process, including but not limited to digital artifacts on the assembly itself and any company or user training records, calibration or metrology records, or user or company standards records, may be combined into an electronic regulatory record for transmittal to a regulatory authority for review. The electrical equipment assembly system 100 may transmit this electronic regulatory record to a regulatory body, e.g., UL, for review for a regulatory certification for the electrical equipment assembly. On review and approval by the regulatory body, a regulatory certification may be electronically transmitted from the regulatory body to the electrical equipment assembly system 100 at which time the regulatory marking may be affixed to the assembled electrical equipment assembly and evidence of the affixation transmitted to the regulatory body to complete the regulatory registration of the completed electrical equipment assembly.

Once any regulatory marks are affixed to the completed electrical equipment assembly, block 2160 stores the final assembly report together with a unique identifier corresponding to the assembled electrical equipment system. It should be appreciated a unique identifier is advantageous to allow a historical recall of the total record of an electrical equipment assembly, including but not limited to, specifications, instructions, documentation, standards, digital artifacts, or regulatory information for a particular assembly.

Figure 22:
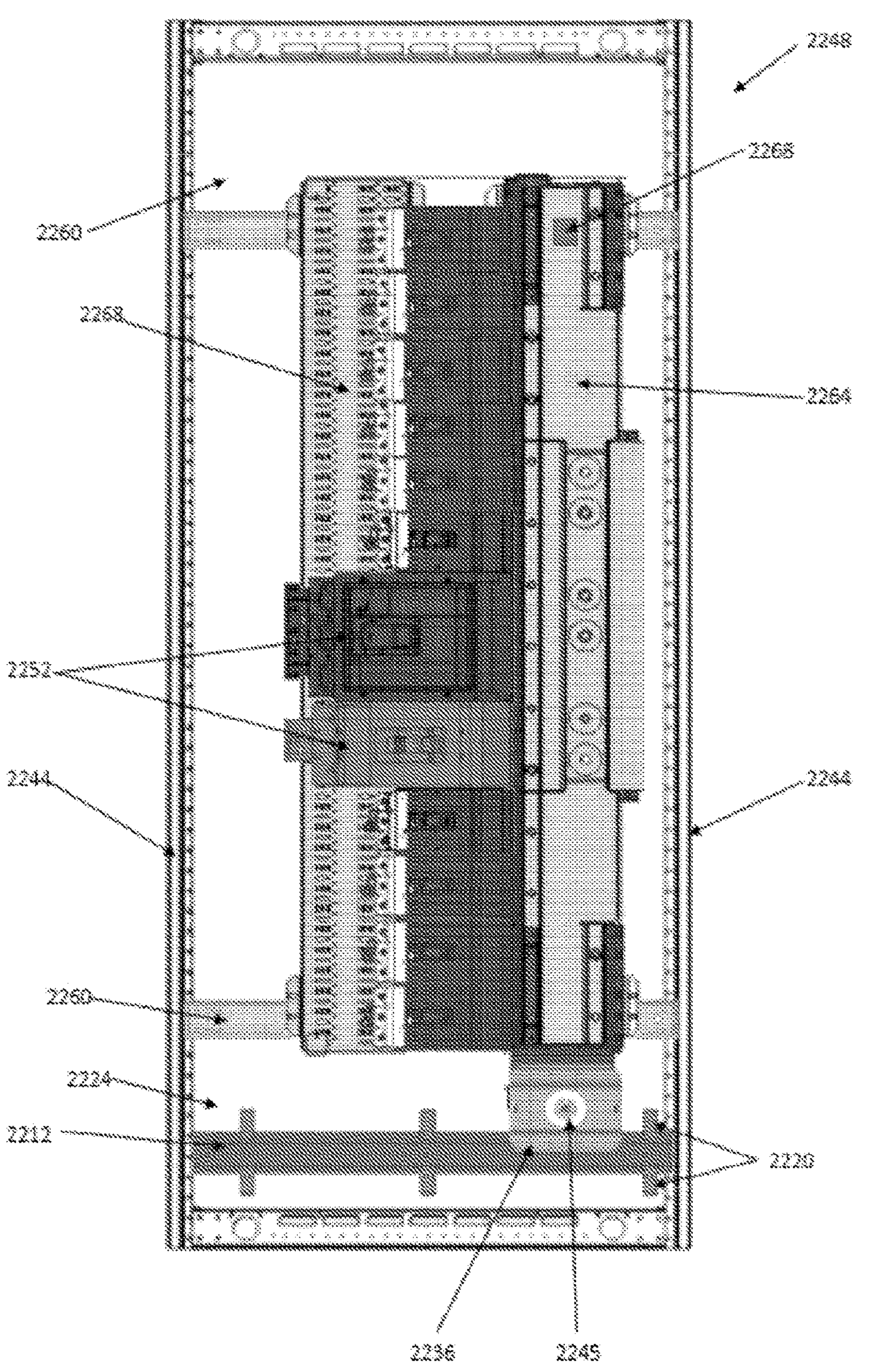
FIG. 22 is a diagram illustrating an electrical equipment assembly, according to one embodiment described herein.

FIG. 22 is a diagram illustrating an electrical equipment assembly example, according to one embodiment described herein.

In one embodiment, an order is placed for a branch circuit breaker kit 2248, as shown in FIG. 22. Assemblies permit a number of branch circuit breakers 2252 to be installed in a small space. A user receives an order from the electrical equipment management system 100 which directs the user to retrieve a series of sub-assemblies from stock, each of which is labeled with an appropriate QR code. The user then retrieves each sub-assembly and scans each QR code into the electrical equipment management system 100 via a scanner when prompted to verify each sub-assembly is present and correct.

The branch circuit breaker kit 2248 includes branch circuit breaker brackets 2256 and the user is prompted to securely attach to the front and rear uprights 2244 on each side of the frame kit 2198. To accomplish this task, the user utilizes a wireless torque wrench where the electrical equipment management system 100 steps the user through the calibration steps for the wrench on a controlled set of torque bolts and subsequently requests the user, using the wireless torque wrench, to tighten bolts to the front and rear uprights 2244 on each side of the frame kit 2198 to a specification transmitted from the electrical equipment management system 100 to the wireless torque wrench. A user may, for example, monitor the visual read out of torque level on the wrench until a specified level is met. When met the wireless torque wrench may provide an indicator, such as a green backlight, and a mechanical indicator, such as a vibrating handle, to indicate the torque bolts are tightened to a correct specification. At which time an assembly step may index from the electrical equipment management system 100 to indicate the user to place a paint mark across the torque bolt head to indicate that bolt has been tightened. When complete, the user may indicate that step completed in the electrical equipment management system 100.

This process may continue with the branch circuit breaker subframes 2260 to securely attach to the branch circuit breaker brackets 2256. A branch circuit breaker bus 2264 securely attached to the branch circuit breaker subframe 2260 and a circuit breaker support frame 2268 is also securely attached to the branch circuit breaker subframe 2260. It should be appreciated these assembly steps may be similar to the above, or unique to the specific electrical equipment assembly with unique assembly, manufacturing, quality, and regulatory specifications and steps to be indicated by the electrical equipment management system 100 based on the designed electrical equipment assembly.

The branch circuit breaker bus 2264 is electrically connected through bus kit 2224 and provides power to the branch circuit breakers 2252, which are attached to and supported by the circuit breaker support frame 2268. Here the electrical equipment management system 100 may indicate an operational quality test be performed to verify the integrity of the electrical connection. It should be appreciated this verification may occur by ATE methods or manual methods by a user where providing power to the branch circuit breakers 2252 and verifying with a calibrated test device, such as a multimeter and entered by a user or system into the electrical equipment management system 100.

It should be appreciated, I the present example, a matrix or 2D barcode 2268 attached to one member of the branch circuit breaker kit 2248, in a position visible after assembly provides access to information describing each component of the branch circuit breaker kit 2248, the proper steps for assembly, the type of hardware and its location in the assembly and any special tools required for assembling the branch circuit breaker kit 2248.

Further, virtual reality or augmented reality may also be used to show the certified assembler, in an approved and certified sequence, where each component of the branch circuit breaker kit 2248 is to be installed.

Once the proscribed assembly, quality, and regulatory steps are completed for the branch circuit breaker kit 2248, the regulatory data collected throughout the assembly and qualification process, including but not limited to digital artifacts on the assembly itself and any company or user training records, calibration or metrology records, or user or company standards records, may be combined into an electronic regulatory record for transmittal to a regulatory authority for review. The electrical equipment assembly system 100 may transmit this electronic regulatory record to a regulatory body, in the present embodiment to Underwriters Laboratory (UL), for review for a regulatory certification for the branch circuit breaker kit 2248.

On review and approval by UL, a UL digital mark indicating regulatory compliance of the completed branch circuit breaker kit 2248 may be electronically transmitted from UL to the electrical equipment assembly system 100. The user may affix the UL regulatory marking to the assembled electrical equipment assembly. Once affixed to the completed branch circuit breaker kit 2248, evidence of the affixation is transmitted to UL to complete the digital regulatory registration of the completed electrical equipment assembly.

Figure 23:
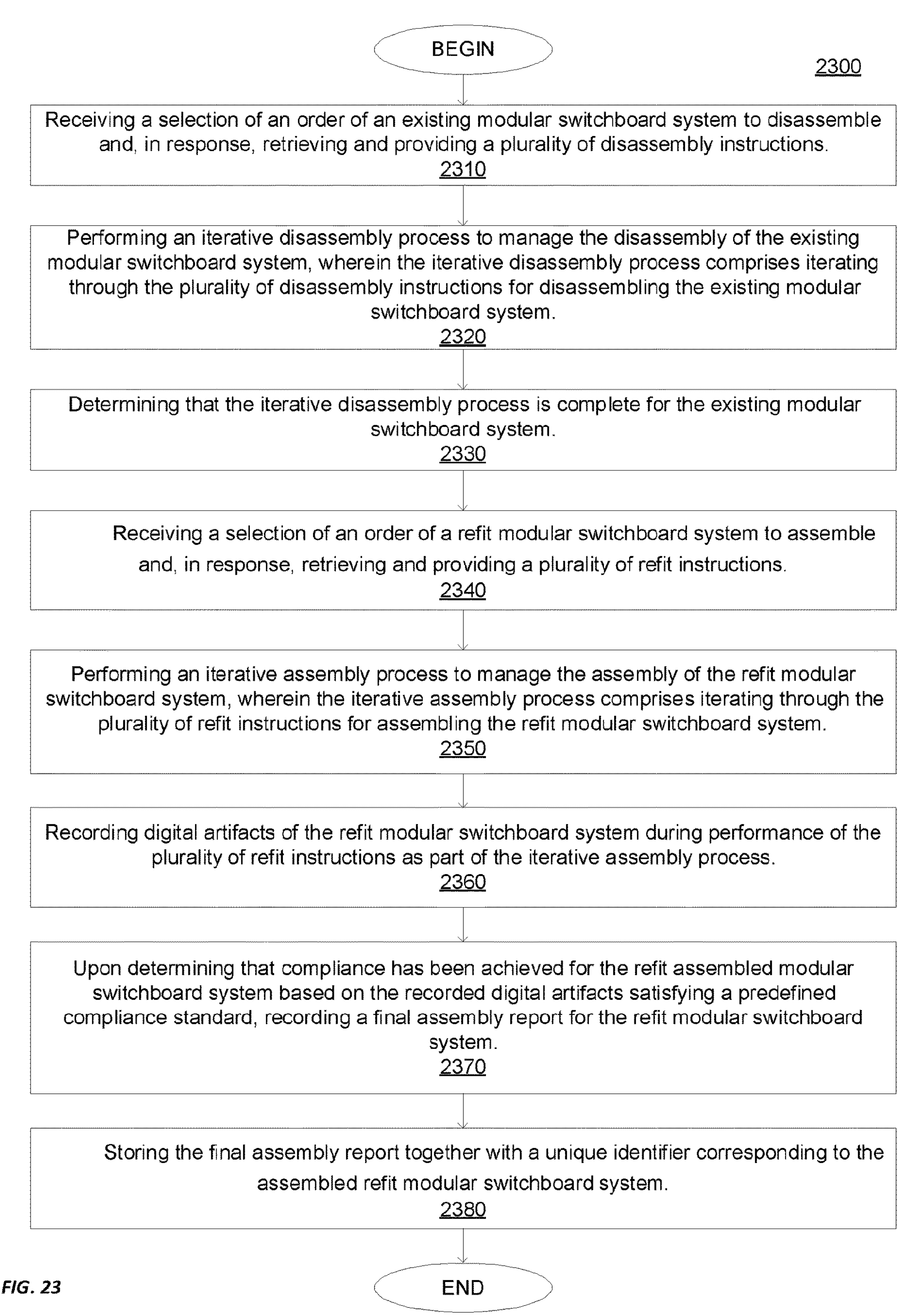
FIG. 23 is a flow diagram illustrating a method for achieving end-to-end electrical equipment system digital regulatory compliance for refit equipment, according to one embodiment described herein.

FIG. 23 is a flow diagram illustrating embodiments of a method for refit assembly of an electrical equipment assembly and acquiring a digital compliance mark through digital means 2300. It should be appreciated that the term "refit" is generic in nature and may include elements of terms such as renovation, recondition, refurbishment, or replacement. No one term is comprehensive to indicate the possible operations contemplated in this disclosure.

The method begins at block 2310 by receiving a selection of an order of an existing electrical equipment system to disassemble and, in response, retrieving and providing a plurality of disassembly instructions. It should be appreciated a complete assembly is not necessary to begin this process. Complete, partial, functional, or non-functional assemblies or sub-assemblies are viable alternatives to begin the refit process.

Block 2319 performs an iterative disassembly process to manage the disassembly of the existing electrical equipment system, wherein the iterative disassembly process comprises iterating through the plurality of disassembly instructions for disassembling the existing electrical equipment system. It should be appreciated the method may proscribe disassembly to the level necessary to provide the possibility of assembly instructions, a determination that digital compliance is not possible based on the state of the electrical equipment assembly, or to a degree to capture and catalog the electrical equipment assembly for future use, such as, but not limited to, a reference design, a certified design, or a certified assembly.

Block 2330 determines that the iterative disassembly process is complete for the existing electrical equipment system. It should be appreciated in various embodiments the process may stop at this point if a determination is made that no viable certification path forward exists. In other embodiments, such designs may be stored as engineering designs or possibly as certified designs for future reference.

A user or system may then receive a selection of an order of a refit electrical equipment system to assemble and, in response, retrieve and provide a plurality of refit instructions in block 2340. Similar to embodiments from FIG. 21, It should be appreciated the assembly process may include not only assembly steps, but also quality assurance checks, as well as regulatory verifications throughout the assembly process.

Block 2350 performs an iterative assembly process to manage the assembly of the refit electrical equipment system, wherein the iterative assembly process comprises iterating through the plurality of refit instructions for assembling the refit electrical equipment system. It should be appreciated while a refit in nature, the series of instructions provided to assemble the electrical equipment system are similar to that in FIG. 21.

Recording of digital artifacts of the refit electrical equipment system during performance of the plurality of refit instructions as part of the iterative assembly process occurs in block 2360. The digital artifacts for the refit electrical equipment system is similar to that of an electrical equipment assembly as discussed supra.

Block 2370 determines that compliance has been achieved for the refit assembled electrical equipment system based on the recorded digital artifacts satisfying a predefined compliance standard, recording a final assembly report for the refit electrical equipment system. It should be appreciated the relevant standards for a refit electrical equipment assembly may be distinct from an electrical equipment assembly that is not being refit.

Embodiments of the process complete at block 2380 with storing the final assembly report together with a unique identifier corresponding to the assembled refit electrical equipment system.

Figure 24:
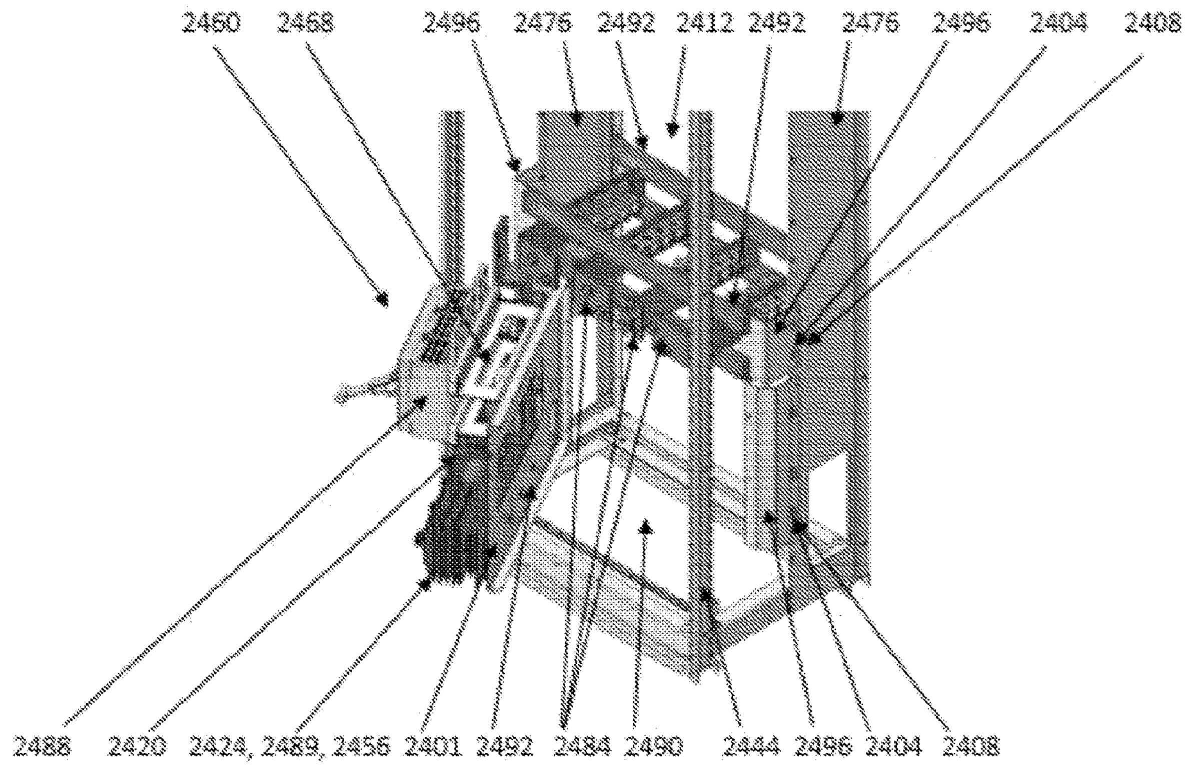
FIG. 24. is a diagram illustrating an electrical equipment assembly, according to one embodiment described herein.

FIG. 24 is a diagram illustrating an electrical equipment assembly example, according to one embodiment described herein. In one embodiment, a user may request to refit one or more breaker of the electrical equipment illustrated in FIG. 24. In such a case, a user may enter any identifying marks into the electrical equipment management system to provide a reference to the system. It should be appreciated that if no such scannable code exists (e.g., a QR code) a user may capture images of the electrical assembly and provide same to the system for processing and possible recognition. Once recognized in some fashion, the system may then provide instructions to disassemble the easy cabling kit 2460 which provides more room for pulling and connecting cables from the utility is disclosed.

Additional instructions from the system may indicate the disassembly of the easy cabling kit 2460 which may be used with standard or slightly modified frame kits, line bus kits 2412 (configured similar to the load bus kit), load bus kits, main breaker/fused switch kits and through bus kits 2424 to easily provide more room for pulling and connecting utility power cables to the line bus kit 2412 and any other wiring that is normally located behind the main breaker/fused switch kit, load bus kit and through bus kit 2424.

Once these steps are completed, a user indicates they are completed at which time the electrical equipment management system may indicate the easy cabling kit includes a main breaker/fused switch mounting bracket on which a standard main breaker/fused switch may be mounted, and an easy cabling subframe on which the mounting bracket is installed.

A user may again indicate to the system these steps have been performed and the system forms assembly instructions with the new breakers desired for the retrofit.

Instructions are provided for the provisioning and installation of the new breakers to the appropriate manufacturing, quality, design, and regulatory standards established by the design. Examples of these instruction may include breaker placement, breaker orientation, breaker fastener torque values, quality steps to verify correct operation of installed breakers, or regulatory steps to verify breaker has met or will meet any relevant regulatory or compliance qualifications.

The process of the electrical equipment management system provisioning steps for completion and the user, autonomous system, or combination indicating same to the electrical equipment management system continues until the electrical assembly has been refit to the established design, quality, manufacturing, and regulatory standards.

A complete regulatory record is compiled and sent to the appropriate regulatory authority. Once the regulatory authority has completed their digital inspection, a compliance certification marking will be transmitted to the electrical equipment system. A user will then retrieve the digital compliance certification marking and affix the mark to the electrical assembly and verify same with the regulatory authority. At this time the assembly has been retrofit and is certified to the appropriate regulatory standard necessary for operation.

Any general-purpose computer systems used in various embodiments of this disclosure may be, for example, general-purpose computers such as those based on Intel PENTIUM-type processor, Motorola PowerPC, Sun UltraSPARC, Hewlett-Packard PA-RISC processors, AMD, or any other type of processor. It should be appreciated that the systems or sub-systems illustrated in FIG. 1 may each utilize a general-purpose computer, be grouped into several general-purpose computers, or the entire system may be operated by a single general-purpose computer. No limitations are implied as to the type or number of general-purpose computers that may be used in various embodiments of this disclosure.

Figure 25:
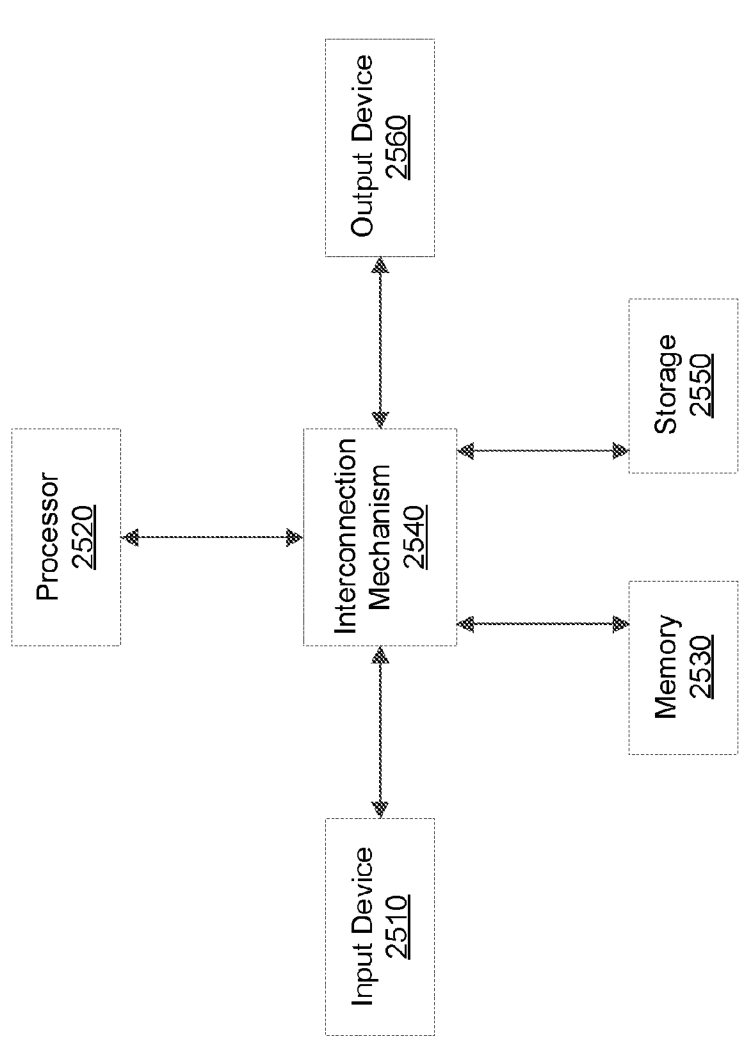
FIG. 25 is a block diagram illustrating a general-purpose computer system, according to one embodiment described herein.

For example, various embodiments of the disclosure may be implemented as specialized software executing in a general-purpose computer system 2500 such as that shown in FIG. 25. The computer system 2500 may include a processor 2519 connected to one or more memory devices 2530, such as a disk drive, memory, or other device for storing data. Memory 2530 is typically used for storing programs and data during operation of the computer system 2500. The computer system 2500 may also include a storage system 2550 that provides additional storage capacity. Components of computer system 2500 may be coupled by an interconnection mechanism 2540, which may include one or more busses (e.g., between components that are integrated within the same machine) and/or a network (e.g., between components that reside on separate discrete machines). The interconnection mechanism 2540 enables communications (e.g., data, instructions) to be exchanged between system components of system 2500.

Computer system 2500 also includes one or more input devices 2510, for example, a keyboard, mouse, trackball, microphone, touch screen, and one or more output devices 2560, for example, a printing device, display screen, speaker. In addition, computer system 2500 may contain one or more interfaces (not shown) that connect computer system 2500 to a communication network (in addition or as an alternative to the interconnection mechanism 2540).

Figure 26:
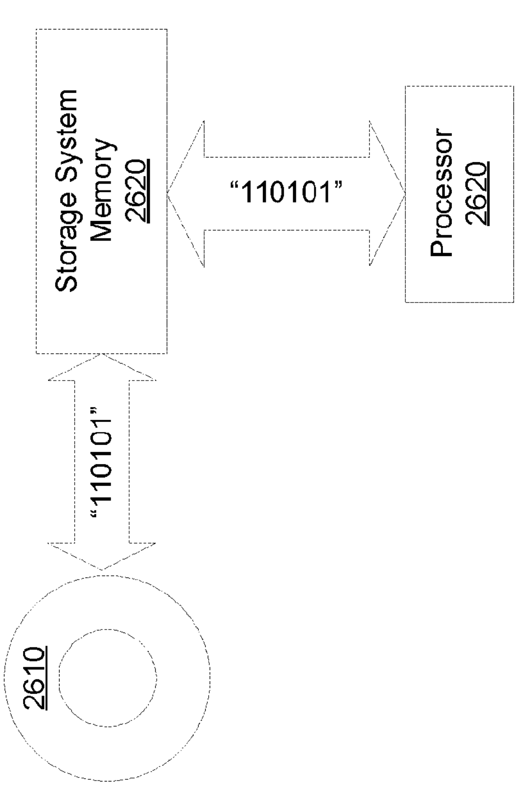
FIG. 26 is a block diagram illustrating a general-purpose storage system, according to one embodiment described herein.

The storage system 2550, shown in greater detail in FIG. 26, typically includes a computer readable and writeable nonvolatile recording medium 2610 in which signals are stored that define a program to be executed by the processor or information stored on or in the medium 2610 to be processed by the program to perform one or more functions associated with embodiments described herein. The medium may, for example, be a disk or flash memory. Typically, in operation, the processor causes data to be read from the nonvolatile recording medium 2610 into another memory 2619 that allows for faster access to the information by the processor than does the medium 2610. This memory 2619 is typically a volatile, random access memory such as a dynamic random-access memory (DRAM) or static memory (SRAM). It may be located in storage system 2600, as shown, or in memory system 2530. The processor 2519 generally manipulates the data within the integrated circuit memory 2530, 2619 and then copies the data to the medium 2610 after processing is completed. A variety of mechanisms are known for managing data movement between the medium 2610 and the integrated circuit memory element 2530, 2619, and the disclosure is not limited thereto. The disclosure is not limited to a particular memory system 2530 or storage system 2550.

The computer system may include specially programmed, special-purpose hardware, for example, an application-specific integrated circuit (ASIC). Aspects of the disclosure may be implemented in software, hardware or firmware, or any combination thereof. Further, such methods, acts, systems, system elements and components thereof may be implemented as part of the computer system described above or as an independent component.

Although computer system 2500 is shown by way of example as one type of computer system upon which various aspects of the disclosure may be practiced, it should be appreciated that aspects of the disclosure are not limited to being implemented on the computer system as shown in FIG. 26. Various aspects of the disclosure may be practiced on one or more computers having a different architecture or components shown in FIG. 26. Further, where functions or processes of embodiments of the disclosure are described herein (or in the claims) as being performed on a processor or controller, such description is intended to include systems that use more than one processor or controller to perform the functions.

Computer system 2500 may be a general-purpose computer system that is programmable using a high-level computer programming language. Computer system 2500 may be also implemented using specially programmed, special purpose hardware. In computer system 2500, processor 2519 is typically a commercially available processor such as the well-known Pentium class processor available from the Intel Corporation. Many other processors are available. Such a processor usually executes an operating system which may be, for example, the Windows 95, Windows 98, Windows NT, Windows 1900, Windows ME, Windows XP, Vista, Windows 7, Windows 10, or progeny operating systems available from the Microsoft Corporation, MAC OS System X, or progeny operating system available from Apple Computer, the Solaris operating system available from Sun Microsystems, UNIX, Linux (any distribution), or progeny operating systems available from various sources. Many other operating systems may be used.

The processor and operating system together define a computer platform for which application programs in high-level programming languages are written. It should be understood that embodiments of the disclosure are not limited to a particular computer system platform, processor, operating system, or network. Also, it should be apparent to those skilled in the art that the present disclosure is not limited to a specific programming language or computer system. Further, it should be appreciated that other appropriate programming languages and other appropriate computer systems could also be used.

One or more portions of the computer system may be distributed across one or more computer systems coupled to a communications network. For example, as discussed above, a computer system that determines available power capacity may be located remotely from a system manager. These computer systems also may be general-purpose computer systems. For example, various aspects of the disclosure may be distributed among one or more computer systems configured to provide a service (e.g., servers) to one or more client computers, or to perform an overall task as part of a distributed system. For example, various aspects of the disclosure may be performed on a client-server or multi-tier system that includes components distributed among one or more server systems that perform various functions according to various embodiments of the disclosure. These components may be executable, intermediate (e.g., IL) or interpreted (e.g., Java) code which communicate over a communication network (e.g., the Internet) using a communication protocol (e.g., TCP/IP). For example, one or more database servers may be used to store device data, such as expected power draw, that is used in designing layouts associated with embodiments of the present disclosure.

It should be appreciated that the disclosure is not limited to executing on any particular system or group of systems. Also, it should be appreciated that the disclosure is not limited to any particular distributed architecture, network, or communication protocol.

Various embodiments of the present disclosure may be programmed using an object-oriented programming language, such as SmallTalk, Java, C++, Ada, or C #(C-Sharp). Other object-oriented programming languages may also be used. Alternatively, functional, scripting, and/or logical programming languages may be used, such as BASIC, ForTran, COBoL, TCL, or Lua. Various aspects of the disclosure may be implemented in a non-programmed environment (e.g., documents created in HTML, XML, or other format that, when viewed in a window of a browser program render aspects of a graphical-user interface (GUI) or perform other functions). Various aspects of the disclosure may be implemented as programmed or non-programmed elements, or any combination thereof. In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments, and advantages are merely illustrative and are not considered elements or limitations of the appended claims except where explicitly recited in a claim (s).

The various embodiments disclosed herein may be implemented as a system, method, or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a non-transitory computer-readable medium. A non-transitory computer-readable medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. Moreover, such computer program code may execute using a single computer system or by multiple computer systems communicating with one another (e.g., using a local area network (LAN), wide area network (WAN), the Internet, etc.). While various features in the preceding are described with reference to flowchart illustrations and/or block diagrams, a person of ordinary skill in the art may understand that each block of the flowchart illustrations and/or block diagrams, as well as combinations of blocks in the flowchart illustrations and/or block diagrams, may be implemented by computer logic (e.g., computer program instructions, hardware logic, a combination of the two, etc.). Generally, computer program instructions may be provided to a processor(s) of a general-purpose computer, special-purpose computer, or other programmable data processing apparatus. Moreover, the execution of such computer program instructions using the processor(s) produces a machine that may carry out a function(s) or act(s) specified in the flowchart and/or block diagram block or blocks.

The flowchart and block diagrams in the Figures illustrate the architecture, functionality and/or operation of possible implementations of various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It may also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

We claim:

1. A method for electrical equipment management, comprising:

upon receiving a login request from a user, validating the login request;

receiving a selection of an order of an electrical equipment system to assemble and, in response, retrieving and providing a plurality of instructions to assemble the electrical equipment system using a plurality of components;

performing an iterative assembly process to manage the assembly of the electrical equipment system by the user, wherein the iterative assembly process comprises iterating through the plurality of instructions for assembling the electrical equipment using the plurality of components;

recording digital artifacts of the electrical equipment system during performance of the plurality of instructions as part of the iterative assembly process;

upon determining that compliance has been achieved for the assembled electrical equipment system based on the recorded digital artifacts satisfying a predefined compliance standard, recording a final assembly report for the electrical equipment system; and storing the final assembly report together with a unique identifier corresponding to the assembled electrical equipment system, wherein the plurality of assembly instructions, when performed during the assembly of the electrical equipment system, results in the assembled electrical equipment system satisfying a defined regulatory standard set by a regulatory body.

2. The method of claim 1, wherein the plurality of instructions further comprises a plurality of assembly instructions, a plurality of quality assurance instructions, and a plurality of regulatory instructions.

3. The method of claim 1, wherein performing the iterative assembly process further comprises:

during performance of a first instruction of the plurality of instructions for assembling the electrical equipment system, receiving, from a first digital assembly tool, over a data communications network, a first network message specifying one or more sensor values collected by one or more sensors of the first digital assembly tool;

retrieving a first predefined range of acceptable values for a first measurement involved in the performance of the first instruction;

comparing the one or more sensor values with the first predefined range of acceptable values; and upon determining that the one or more sensor values are within the first predefined range of acceptable values, advancing to a next instruction of the plurality of instructions for assembling the electrical equipment system.

4. The method of claim 3, wherein the one or more sensor values of the first digital assembly tools include a tool calibration data set, wherein the first digital assembly tools include a torque wrench capable of detecting and wirelessly transmitting a torque value, wherein the torque wrench is configured to perform an operation comprising:

wirelessly receiving via a transceiver a target torque range associated with an assembly task from the electrical equipment system;

measuring a torque value for the assembly task based on the user operating the torque wrench for the associated assembly task;

comparing the torque value for the assembly task to the target torque range for the associated assembly task; and upon determining that the measured torque value for the associated assembly task is within the received target torque range, wirelessly transmitting to the electrical equipment management system to advance to a next instruction of the plurality of instructions for assembling the electrical equipment system.

5. The method of claim 1, wherein performing the iterative assembly process further comprises:

during performance of a second instruction of the plurality of instructions for assembling the electrical equipment system, receiving, over the data communications network, a second network message specifying one or more digital artifacts collected by a machine vision system;

retrieving a second predefined range of acceptable values for a second measurement involved in the performance of the second instruction;

comparing the one or more digital artifacts with the second predefined range of acceptable values; and upon determining that the one or more digital artifacts are within the second predefined range of acceptable values, advancing to a next instruction of the plurality of instructions for assembling the electrical equipment system.

6. The method of claim 5, further comprising:

identifying the one or more digital artifacts by processing one or more digital images captured by one or more image sensors using a digital image processing system.

7. The method of claim 6, wherein the one or more image sensors are within at least one of an Augmented Reality device or a Virtual Reality device.

8. The method of claim 6, wherein performing the iterative assembly process further comprises utilizing the digital image processing system to identify a predefined feature within the one or more digital images, wherein the predefined feature corresponds to one or more bolts which utilize visual torque value indicators.

9. The method of claim 5, wherein performing the iterative assembly process further comprises developing performance metrics from the received digital artifacts including system configurations, assembly times, or assembly step failures, wherein optimizing subsequent assembly, quality assurance, and regulatory instructions are provided by a rules engine based on the developed performance metrics, and, wherein optimizing instructions are provided into the rules engine for subsequent assembly, quality assurance, and regulatory instructions.

10. The method of claim 1, wherein performing the iterative assembly process further comprises:

during performance of a third instruction of the plurality of instructions for assembling the electrical equipment system, receiving, over the data communications network, a third network message specifying one or more regulatory compliance data sets received from the one or more digital artifacts, wherein the one or more regulatory compliance data sets include the tool calibration data set;

transmitting the one or more regulatory compliance data sets to the regulatory body;

receiving a regulatory mark from the regulatory body based on the transmitted one or more regulatory compliance data sets;

affixing the regulatory mark to the completed electrical equipment system; and upon determining that the regulatory mark is properly affixed to the electrical equipment system, advancing to a next instruction of the plurality of instructions for assembling the electrical equipment system.

11. A method for electrical equipment system management, comprising:

receiving a selection of an order of an electrical equipment system to assemble and, in response, retrieving and providing an instruction to assemble the electrical equipment system using a plurality of components;

performing an assembly process to manage the assembly of the electrical equipment system by a user, wherein the assembly process comprises performing the instruction for assembling the electrical equipment system using the plurality of components;

recording digital artifacts of the electrical equipment system during performance of the instruction as part of the assembly process;

upon determining the instruction has been completed based on the recorded digital artifacts satisfying a predefined compliance standard, determining a next instruction based on the completion of the assembly step and the recorded digital artifacts;

retrieving and providing the next instruction based on the completion of the assembly step and the recorded digital artifacts;

upon determining that compliance has been achieved for the assembled electrical equipment system based on the recorded digital artifacts satisfying a predefined compliance standard, recording a final assembly report for the electrical equipment system; and storing the final assembly report together with a unique identifier corresponding to the assembled electrical equipment system, wherein the instruction further comprises a regulatory instruction, wherein the regulatory instruction, when performed during the assembly of the electrical equipment system, results in the assembled electrical equipment satisfying a defined regulatory standard set by a regulatory body.

12. The method of claim 11, wherein performing the assembly process further comprises:

during performance of a first instruction for assembling the electrical equipment system, receiving, from a first digital assembly tool, over a data communications network, a first network message specifying one or more sensor values collected by one or more sensors of the first digital assembly tool;

retrieving a first predefined range of acceptable values for a first measurement involved in the performance of the first instruction;

comparing the one or more sensor values with the first predefined range of acceptable values; and upon determining that the one or more sensor values are within the first predefined range of acceptable values, advancing to the next instruction for assembling the electrical equipment system.

13. The method of claim 12, wherein the one or more sensor values of the first digital assembly tools include a tool calibration data set.

14. The method of claim 12, wherein the first digital assembly tools include a torque wrench configured to detect and wirelessly transmit a torque value by performing an operation, comprising:

wirelessly receiving via a transceiver a target torque range associated with an assembly task from the electrical equipment system;

measuring a torque value for the assembly task based on the user operating the torque wrench for the associated assembly task;

comparing the torque value for the assembly task to the target torque range for the associated assembly task; and upon determining that the measured torque value for the associated assembly task is within the received target torque range, wirelessly transmitting to the electrical equipment management system to advance to the next instruction of the plurality of instructions for assembling the electrical equipment system.

15. The method of claim 11, wherein performing the assembly process further comprises:

during performance of a second instruction for assembling the electrical equipment system, receiving, over the data communications network, a second network message specifying one or more digital artifacts collected by a machine vision system;

retrieving a second predefined range of acceptable values for a second measurement involved in the performance of the second instruction;

comparing the one or more digital artifacts with the second predefined range of acceptable values; and upon determining that the one or more digital artifacts are within the second predefined range of acceptable values, advancing to the next instruction of the plurality of instructions for assembling the electrical equipment system.

16. The method of claim 15, further comprising:

identifying the one or more digital artifacts by processing one or more digital images captured by one or more image sensors using a digital image processing system.

17. The method of claim 16, wherein the one or more image sensors are within at least one of an Augmented Reality device or a Virtual Reality device.

18. The method of claim 16, wherein the digital image processing system is configured to perform at least one of (i) an Optical Character Recognition (OCR) process, (ii) deep learning type process, or (iii) a feature recognition analysis using a convolutional neural network.

19. The method of claim 17, wherein performing the assembly process further comprises utilizing the digital image processing system to identify a predefined feature within the one or more digital images, wherein the predefined feature corresponds to one or more bolts which utilize visual torque value indicators.

20. The method of claim 15, wherein performing the assembly process further comprises developing performance metrics from the received digital artifacts including system configurations, assembly times, or assembly step failures.

21. The method of claim 20, wherein optimizing subsequent assembly, quality assurance, and regulatory instructions are provided by a rules engine based on the developed performance metrics, wherein optimizing instructions are provided into the rules engine for subsequent assembly, quality assurance, and regulatory instructions.

22. The method of claim 11, wherein performing the assembly process further comprises:

during performance of a third instruction of the plurality of instructions for assembling the electrical equipment system, receiving, over the data communications network, a third network message specifying one or more regulatory compliance data sets received from the one or more digital artifacts, wherein the one or more regulatory compliance data sets include the tool calibration data set;

transmitting the one or more regulatory compliance data sets to the regulatory body;

receiving a regulatory mark from the regulatory body based on the transmitted one or more regulatory compliance data sets;

affixing the regulatory mark to the completed electrical equipment system; and upon determining that the regulatory mark is properly affixed to the electrical equipment system, advancing to the next instruction of the plurality of instructions for assembling the electrical equipment system.

23. An electrical equipment management system, comprising:

one or more computer processors; and a non-transitory computer-readable memory containing computer program code that, when executed by operation of the one or more computer processors, performs an operation for managing data access within a first computing environment, the operation comprising:

receiving a selection of an order of an electrical equipment system to assemble and, in response, retrieving and providing a plurality of instructions to assemble the electrical equipment system using a plurality of components;

performing an iterative assembly process to manage the assembly of the electrical equipment system by the user, wherein the iterative assembly process comprises iterating through the plurality of instructions for assembling the electrical equipment system using a plurality of components;

recording digital artifacts of the electrical equipment system during performance of the plurality of instructions as part of the iterative assembly process;

upon determining that compliance has been achieved for the assembled electrical equipment system based on the recorded digital artifacts satisfying a predefined compliance standard, recording a final assembly report for the electrical equipment system; and storing the final assembly report together with a unique identifier corresponding to the assembled electrical equipment system, wherein the plurality of instructions further comprises a plurality of regulatory instructions, wherein the plurality of regulatory instructions, when performed during the assembly of the electrical equipment system, results in the assembled electrical equipment satisfying a defined regulatory standard set by a regulatory body.

24. The system of claim 23, wherein performing the iterative assembly process further comprises:

during performance of a first instruction of the plurality of instructions for assembling the electrical equipment system, receiving, from a first digital assembly tool, over a data communications network, a first network message specifying one or more sensor values collected by one or more sensors of the first digital assembly tool;

retrieving a first predefined range of acceptable values for a first measurement involved in the performance of the first instruction;

comparing the one or more sensor values with the first predefined range of acceptable values; and upon determining that the one or more sensor values are within the first predefined range of acceptable values, advancing to a next instruction of the plurality of instructions for assembling the electrical equipment system.

25. The system of claim 24, wherein the one or more sensor values of the first digital assembly tools include a tool calibration data set.

26. The system of claim 24, wherein the first digital assembly tools include a torque wrench capable of detecting and wirelessly transmitting a torque value, comprising:

wirelessly receiving via a transceiver a target torque range associated with an assembly task from the electrical equipment system;

measuring a torque value for the assembly task based on the user operating the torque wrench for the associated assembly task;

comparing the torque value for the assembly task to the target torque range for the associated assembly task; and upon determining that the measured torque value for the associated assembly task is within the received target torque range, wirelessly transmitting to the electrical equipment management system to advance to a next instruction of the plurality of instructions for assembling the electrical equipment system.

27. The system of claim 23, wherein performing the iterative assembly process further comprises:

during performance of a second instruction of the plurality of instructions for assembling the electrical equipment system, receiving, over the data communications network, a second network message specifying one or more digital artifacts collected by a machine vision system;

retrieving a second predefined range of acceptable values for a second measurement involved in the performance of the second instruction;

comparing the one or more digital artifacts with the second predefined range of acceptable values; and upon determining that the one or more digital artifacts are within the second predefined range of acceptable values, advancing to a next instruction of the plurality of instructions for assembling the electrical equipment system.

28. The system of claim 27, further comprising:

identifying the one or more digital artifacts by processing one or more digital images captured by one or more image sensors using a digital image processing system, wherein the digital image processing system is configured to perform at least one of (i) an Optical Character Recognition (OCR) process, (ii) deep learning type process, or (iii) a feature recognition analysis using a convolutional neural network, and wherein performing the iterative assembly process further comprises utilizing the digital image processing system to identify a predefined feature within the one or more digital images, wherein the predefined feature corresponds to one or more bolts which utilize visual torque value indicators.

29. The system of claim 27, wherein performing the iterative assembly process further comprises developing performance metrics from the received digital artifacts including system configurations, assembly times, or assembly step failures.

30. The system of claim 29, wherein optimizing subsequent assembly, quality assurance, and regulatory instructions are provided by a rules engine based on the developed performance metrics, wherein optimizing instructions are provided into the rules engine for at least one of subsequent assembly, quality assurance, or regulatory instructions.

31. The system of claim 23, wherein performing the iterative assembly process further comprises:

during performance of a third instruction of the plurality of instructions for assembling the electrical equipment system, receiving, over the data communications network, a third network message specifying one or more regulatory compliance data sets received from the one or more digital artifacts, wherein the one or more regulatory compliance data sets include the tool calibration data set;

transmitting the one or more regulatory compliance data sets to the regulatory body;

receiving a regulatory mark from the regulatory body based on the transmitted one or more regulatory compliance data sets;

affixing the regulatory mark to the completed electrical equipment system; and upon determining that the regulatory mark is properly affixed to the electrical equipment system, advancing to a next instruction of the plurality of instructions for assembling the electrical equipment system.

32. The method of claim 1, wherein the digital artifacts further comprises electrical data parameters that were measured as part of one of the plurality of instructions for assembling the electrical equipment.

* * * * *